United States Patent
Crespo Vázquez et al.

(10) Patent No.: US 9,952,448 B2
(45) Date of Patent: Apr. 24, 2018

(54) EYEWEAR LENS PRODUCTION BY ADDITIVE TECHNIQUES

(71) Applicant: Indizen Optical Technologies, S.L., Madrid (ES)

(72) Inventors: Daniel Crespo Vázquez, Rancho Palos Verde, CA (US); José Alonso Fernández, Madrid (ES); Juan Antonio Quiroga, Madrid (ES); Andrew John McKenzie, Long Beach, CA (US); David Mark Ambler, Rancho Palos Verde, CA (US)

(73) Assignee: Indizen Optical Technologies, S.L., Madrid (ES)

( * ) Notice: Subject to any disclaimer, the term of this patent is extended or adjusted under 35 U.S.C. 154(b) by 467 days.

(21) Appl. No.: 14/538,242

(22) Filed: Nov. 11, 2014

(65) Prior Publication Data

US 2015/0277146 A1 Oct. 1, 2015

Related U.S. Application Data

(63) Continuation-in-part of application No. 14/226,686, filed on Mar. 26, 2014.

(51) Int. Cl.
*B33Y 10/00* (2015.01)
*G02C 7/02* (2006.01)
(Continued)

(52) U.S. Cl.
CPC .......... *G02C 7/027* (2013.01); *B29C 67/0066* (2013.01); *B29D 11/00442* (2013.01);
(Continued)

(58) Field of Classification Search
None
See application file for complete search history.

(56) References Cited

U.S. PATENT DOCUMENTS 820,849 A 5/1906 Copps
4,575,330 A 3/1986 Hull
(Continued)

FOREIGN PATENT DOCUMENTS

EP 2265430 B1 12/2010
EP 2265430 B1 10/2011
(Continued)

OTHER PUBLICATIONS

Matthew Peach, Laser additive manufacturing: separating fact from fiction, optics.org, Apr. 11, 2014, SPIE Events Europe, Ltd.; Cardiff, United Kingdom.

*Primary Examiner* — Robert S Walters, Jr.
(74) *Attorney, Agent, or Firm* — Sheppard, Mullin, Richter & Hampton LLP

(57) ABSTRACT

A method that adds material selectively to a lens substrate and is used to produce a customized eyewear lens with optical power that is discernibly different from the optical power of the lens substrate. The method involves obtaining the lens substrate, calculating and generating an added material design to convert the lens substrate's optical power to a desired optical power for the customized eyewear lens, contacting the lens substrate with a bulk source of flowable radiation-polymerizable material, and irradiating the material with radiation that is controlled for wavelength range, energy and spatial distribution to polymerize the radiation-polymerizable material only in a selected area according to the added material design. The method does not require the use of external shaping structures to form the customized lens on the lens substrate, and the added material is integrally bonded to the substrate.

18 Claims, 6 Drawing Sheets

(51) Int. Cl.
*B29C 67/00* (2017.01)
*B29D 11/00* (2006.01)
*B33Y 80/00* (2015.01)
*B33Y 50/02* (2015.01)

(52) U.S. Cl.
CPC ......... *B29D 11/00951* (2013.01); *B33Y 10/00* (2014.12); *B33Y 50/02* (2014.12); *B33Y 80/00* (2014.12)

(56) References Cited

U.S. PATENT DOCUMENTS

| | | |
|---|---|---|
| 4,873,029 A | 10/1989 | Blum |
| 5,121,329 A | 6/1992 | Crump |
| 5,178,800 A | 1/1993 | Blum |
| 6,051,179 A | 4/2000 | Hagenau |
| 6,749,779 B2 | 6/2004 | Soane et al. |
| 7,002,744 B2 | 2/2006 | Evans et al. |
| 7,235,195 B2 | 6/2007 | Andino et al. |
| 7,658,976 B2 | 2/2010 | Kritchman |
| 7,905,594 B2 | 3/2011 | Widman et al. |
| 8,088,313 B2 | 1/2012 | Hagmann et al. |
| 8,109,631 B2 | 2/2012 | Guilloux et al. |
| 8,123,999 B2 | 2/2012 | Priedeman, Jr. et al. |
| 8,240,849 B2 | 8/2012 | Widman et al. |
| 8,313,828 B2 | 11/2012 | Widman et al. |
| 8,318,055 B2 | 11/2012 | Widman et al. |
| 8,344,046 B2 | 1/2013 | Tucker et al. |
| 8,399,607 B2 | 3/2013 | April, Jr. et al. |
| 8,409,670 B2 | 4/2013 | Mori et al. |
| 2012/0019936 A1 | 1/2012 | Blessing et al. |
| 2012/0105800 A1 | 5/2012 | Allione et al. |
| 2015/0137426 A1* | 5/2015 | Van Esbroeck ........ B33Y 10/00 264/401 |
| 2015/0153589 A1 | 6/2015 | Meschenmoser et al. |
| 2015/0276987 A1 | 10/2015 | McKenzie et al. |

FOREIGN PATENT DOCUMENTS

| | | |
|---|---|---|
| EP | 2474404 A1 | 7/2012 |
| EP | 2469309 B1 | 8/2013 |
| ES | 2604414 | 6/2013 |
| KR | 20140011874 | 1/2014 |
| WO | 2013167528 | 11/2013 |
| WO | 2014049273 | 4/2014 |
| WO | 2015014380 | 2/2015 |
| WO | 2015014381 | 2/2015 |

* cited by examiner

EYEWEAR LENS PRODUCTION BY ADDITIVE TECHNIQUES

CROSS-REFERENCE TO RELATED APPLICATIONS

This application is a continuation-in-part of application Ser. No. 14/226,686, filed Mar. 26, 2014.

FEDERALLY SPONSORED RESEARCH OR DEVELOPMENT

Not applicable.

JOINT RESEARCH AGREEMENT

Not applicable.

SEQUENCE LISTING

Not applicable.

BACKGROUND OF THE INVENTION

Field of the Invention

The field of the invention relates generally to methods of producing eyewear lenses, particularly finished lenses and lens blanks using additive techniques rather than removal of excess material.

Description of Related Art

Prescription eyewear lenses are commonly used to correct human vision errors, aberrations and focusing deficiencies caused by genetics, age, disease or other factors. In addition to correcting physiological vision problems, eyewear lenses may be used as a fashion accessory or to protect the eyes from hazards or discomfort.

Prescription eyewear lenses must be prepared to meet each individual's specific vision requirements. Various techniques have been developed over the years to achieve this goal. One common technique involves stocking or obtaining semi-finished lens blanks that form a series of starting blocks with discrete surface curvatures such that only one side of the blank needs to be further shaped to achieve the given prescription. The surfaced lens then needs to be polished to an optical finish and edged to the eyewear frame shape individually selected. This can be a time-consuming process. More recently, another technique of digitally surfacing lenses using computer controlled machining has gained prominence. Digital surfacing often requires only a limited number of semi-finished lens blanks or other starting lens pieces, too, but the computer-controlled surfacing equipment allows more complex (e.g., multifocal) or individualized prescriptions to be prepared. This method can involve significant expenses in equipment and trained personnel.

Each of these techniques could be described as subtractive production methods, in which excess lens material is removed to create the desired prescription or lens properties. In such processes, there is often a significant amount of waste material that must be safely handled, stored and eliminated.

Another technique involves stocking or obtaining finished lenses that will only be edged to the individual's selected eyewear frame. This technique generates less waste material at the final edging facility. However, finished lenses typically only approximate prescriptions in 0.25 D increments of sphere and cylinder corrections and, therefore, may be less accurate for eyesight correction. Even if stocked at such 0.25 D increments, the number of stocked units needed to cover the wide range of prescriptions an eyecare professional will need is huge. Thus, either a very extensive inventory is required, or only a small range of prescriptions are stocked, usually those dispensed with the greatest frequency. These downfalls counteract the processing advantages that may be realized with finished lenses.

It would be desirable then, if alternative processes could be devised for eyewear lens preparation. Additive techniques may present another option. Some initial developments of additive-type techniques have been described in the prior art, but still require the use of at least one additional molding surface. For example, U.S. Pat. Nos. 4,873,029, 5,178,800 and 7,002,744 B2 each describe methods of producing various optical parts by positioning pre-existing lenses or forms at known, controlled distances from a molding surface to form a lens-forming cavity, placing liquid lens-forming material in the cavity, and solidifying the lens-forming material onto the pre-existing lens or form to form a new composite optical part when the molding surface is removed. However, these techniques still require at least one precision molding surface for manufacturing, and that molding surface must be prepared, properly stored and maintained to achieve consistent and acceptable optical-quality production.

Other additive techniques such as those based on stereolithography, fused deposition, ink jet or other 3-D printing advancements may be of interest. Many of these require a support on which to build the desired 3-dimensional part. Often these supports are flat platforms, which are not intrinsically suitable for prescription eyewear lenses. In addition, most supports are carefully removed or separated from the final printed object, acting only as a base upon which to build the desired object. Some developments have occurred for production of flexible contact lenses using these types of techniques. For instance, U.S. Pat. Nos. 7,905,594 B2, 8,240,849 B2, 8,313,828 B2, 8,318,055 B2 and EP 2265430 B1 describe use of a precision mold or a forming optic as the removable platform on which to build the contact lens. In these descriptions, the forming optic is a precisely shaped structure on which the 3-D part is built, and which is designed to impart its shape, by replication, to the 3-D part. Irradiating energy that causes the polymerization of the reactive solution is directed through the precision mold or forming optic to build the part against the mold or forming optic's precision optical surface. The ophthalmic part or contact lens is then removed from the mold or forming optic, to provide, by replication, an optical surface finish and desired lens curvature on the surface of the 3-D part that was in contact with the mold or forming optic. In another approach, U.S. Pat. No. 7,235,195 B2 describes contact lenses produced by stereolithography at the top of a liquid bath, specifically without the use of any mold or support. All features of the desired lens are created by spatially controlled polymerization of the surface of the liquid bath via radiation exposure, preferably from two beams at different angles.

However, some disadvantages of additive production hamper implementation of these techniques for eyewear lenses. Many of these techniques still require the use of at least one expensive and sensitive precision mold or forming optic (collectively, external shaping structures) in order to get the shape or surface finish desired on the created additive part. In addition, such external shaping structures must be robust enough to allow undamaged removal of the created part, and preferably, allow reuse for making multiple parts with the same precision external shaping structure. Other concerns with additive production include the cost, time and complexity of precision placement and control of material deposition, particularly for added layers. Eyewear lenses require much more material than contact lenses or intraocular implants and therefore exacerbate these disadvantages. In addition, materials suitable for additive production of general usage, non-optical plastic parts, or even materials suitable for small, thin, flexible contact lenses, may not combine the necessary optical and structural properties required for eyewear lenses that will be mounted in eyeglass frames. Yet, efforts toward improvements and new inventions in the field of additive production techniques are warranted given the potential advantages of these methods.

BRIEF SUMMARY OF THE INVENTION

The invention is directed to the use of an existing optical lens substrate as a starting structure on which specific ophthalmic features are built using additive production techniques. In contrast to other approaches to additive manufacture, the lens substrate becomes an integral part of the final eyewear lens, and additive production processes are used to change its optical and physical characteristics to create an eyewear lens customized to the specific wearer's needs.

Preferably, the lens substrate is selected from finished lens blanks, semi-finished lens blanks, plano lens blanks, plano edged lenses and finished edged lenses. The lens substrate comprises at least a first and second surface, one of which will be positioned nearest the eye and one that will be positioned farthest away from the eye when worn.

The process includes calculating the modifications needed to convert the lens substrate's optical power to the optical power desired for the customized eyewear lens and then generating an added material design to achieve these modifications by selectively adding material to the lens substrate. In another embodiment of the invention, in addition to modifying optical power, the added material design is calculated and generated to modify other optical properties of the lens substrate for the customized eyewear lens, such as prism, magnification, oblique aberration, power distribution at different locations on the lens, individual field of view, individual angle of view for near vision, decentration, back vertex distance, frame shape, eyewear frame wrap angle, and eyewear frame tilt. The added material design may optionally add other features or properties to the customized lens as well as optical power.

New additive techniques were created that employ flowable radiation-polymerizable material(s), and selective irradiation of those material(s) to polymerize the material only in selected areas of irradiation in accordance with the calculated and generated added material design. In this manner, new surfaces or structures are formed on the lens substrate to provide the desired properties of the customized eyewear lens. In these techniques, the irradiation is provided by radiation from an irradiation assembly comprising at least one irradiating beam. The irradiation beam is controlled for wavelength range, energy and spatial distribution such that the radiation-polymerizable material polymerizes only in a selected area according to the added material design. In a preferred embodiment, the area of irradiation is controlled for spatial position relative to the lens substrate surface, and the added material is integrally bonded to the lens substrate. Advantageously, these new additive techniques do not require or use external shaping structures, such as molds or forming optics.

In a preferred embodiment, the area of irradiation is controlled for spatial position relative to the lens substrate by moving the lens substrate, the irradiation assembly and/or the irradiating beam.

In a preferred embodiment, only one surface of the substrate contacts the bulk of the flowable radiation-polymerizable material. In another preferred embodiment, one surface of the lens substrate is covered or protected by protective material such that the flowable radiation-polymerizable material only contacts the unprotected surface of the substrate. In a further preferred embodiment, the area of contact with the flowable radiation-polymerizable material prior to its irradiation is limited to a small area of the lens substrate's surface. In another preferred embodiment, flowable radiation-polymerizable material contacts both the first and second surfaces of the substrate, either simultaneously or sequentially.

One preferred method for contacting the lens substrate with a bulk source of the flowable radiation-polymerizable material is by dipping the substrate into the material. In another preferred embodiment, the bulk source of flowable radiation-polymerizable material is delivered via an outer delivery jacket surrounding the irradiation assembly for contacting the lens substrate. In another preferred embodiment, the irradiation assembly is in contact with the flowable radiation-polymerizable material during irradiation, and the assembly comprises a protective casing and a cover plate.

In a preferred embodiment, the orientation of the lens substrate relative to the radiation-polymerizable material can be controlled relative to the flowable radiation-polymerizable material. In a preferred embodiment, the lens substrate is mounted in a support comprising one or more position and movement controls; in a further preferred embodiment, these position and movement controls are selected from translational movement along the X axis, the Y axis and/or the Z axis, and rotational movement in angle $\alpha$ around the X axis. In another preferred embodiment, the lens substrate is moving with respect to the flowable radiation-polymerizable material as the material is contacted and/or irradiated. In another preferred embodiment, the lens substrate is moving at a non-perpendicular angle with respect to the flowable radiation-polymerizable material while the material is being contacted and/or irradiated; this is particularly preferred with the dipping method for contacting the lens substrate with the flowable material. In another preferred embodiment, the angle, speed and/or direction of movement of the lens substrate varies while the flowable radiation-polymerizable material is being contacted and/or irradiated. In another preferred embodiment, moving the lens substrate during irradiation further comprises forming the added material such that it smoothes over features such as the edge of the added material, defects of the added material, defects on a surface of the lens substrate or discontinuities on the surface of the lens substrate.

In another preferred embodiment, the lens substrate is mounted in a support with one or more position and movement controls. These controls are used to control the orientation and/or movement of the lens substrate relative to the flowable radiation-polymerizable material while it is contacting the bulk source of the flowable material.

In a preferred embodiment, the radiation used to irradiate the flowable radiation-polymerizable material is selected from thermal, microwave, radio-frequency, ultraviolet, visible and infrared energy.

In a preferred embodiment, the added material has measurably different optical or physical properties from the lens substrate. In one preferred embodiment, the added material's measurably different properties are selected from refractive index, Abbe value, abrasion resistance, impact resistance, resistance to organic solvents, resistance to bases, Tg, visible color, visible transmittance, UV transmittance, electrical conductivity, polarization, and photochromic properties.

In preferred embodiments of the invention, the radiation-polymerizable material further comprises components to tailor the optical, mechanical, chemical or physical properties of the eyewear lens. In a preferred embodiment, the components are selected from photo-initiators, thermal initiators, UV absorbers, infrared reflectors, visible tints, dyes, pigments, photochromic agents, agents, electrochromic agents, thermal stabilizers, electrically conductive materials, liquid crystal materials, light absorbing particles, light reflecting particles, and active or passive polarizing materials. In another preferred embodiment, the components may include decorations, micro-optics, particles with properties that enhance or modify the radiation-polymerizable material's physical or optical properties, embedded sensors, transmitters or displays.

DETAILED DESCRIPTION OF THE INVENTION

Figure 1:
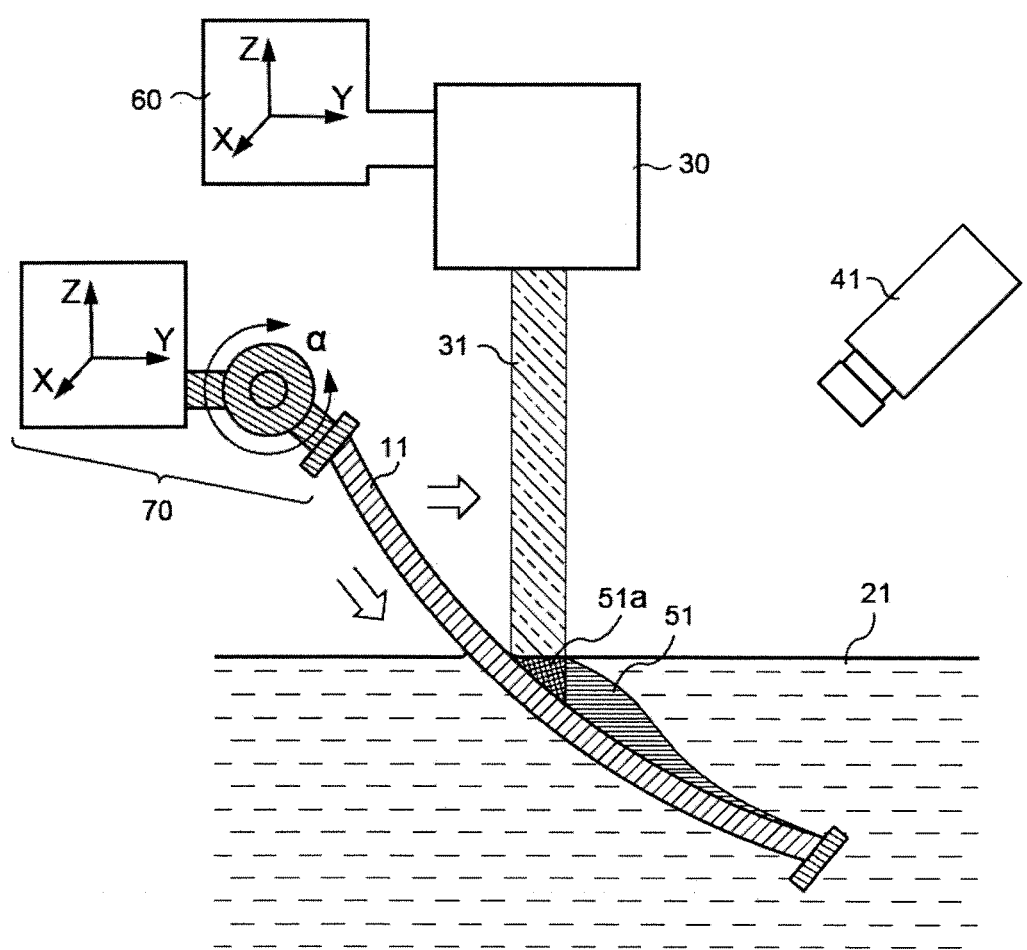
FIG. 1 illustrates one example of a method of the invention, including a method for measuring the optical properties of the added material and/or the combined optical properties of the added material and the lens substrate, during production of the customized eyewear lens.

The present invention is embodied in additive methods to produce an eyewear lens by contacting an existing lens substrate with a bulk source of flowable radiation-polymerizable material and selectively irradiating the flowable radiation-polymerizable material such that it is polymerized onto the lens substrate according to a specific calculated design. In this way, the invention enables individually customized eyewear lenses to be created that have new optical and physical properties as desired by building upon standard lens substrates.

In co-pending application Ser. No. 14/226,686, multi-layer approaches to accomplish a change in optical properties are described. Another approach is described here. This second inventive approach adds material in a more continuous manner by placing the lens substrate in contact with flowable radiation-polymerizable material, and then selectively and sequentially irradiating that material to build up new features on the lens substrate according to the calculated design. In this description, the calculated design will be referred to as the added material design. The added material comprises flowable radiation-polymerizable material that has contacted the lens substrate and has been selectively irradiated to polymerize it according to the added material design.

Eyewear lenses are ophthalmic lenses worn in front of the eyes. They may be plano, prescription or non-prescription lenses. Depending on the needs and desires of the individual, they may serve one or more purposes, including correcting vision, providing protection or improved comfort for the eyes, or being a fashionable accessory. Eyewear lenses are commonly mounted in structures designed to hold the lenses in front of the user's eyes. Such structures include spectacle (eyeglass) frames, goggles, helmets, visors, lens carriers and other mounting devices.

The present invention addresses the need to customize a lens for a specific person. This can provide the individual's vision corrective prescription and/or include other eyewear lens attributes that the person has requested. Some examples of other attributes the person may want include fashion or functional tints, photochromic response to sunlight, or increased abrasion or impact resistance. In addition, the optical design of the customized lens may be selected or optimized for the individual's specific frame configuration, specific tasks the user will perform, or the way the individual moves their eyes or head to accomplish desired tasks. For example, if a very narrow frame has been chosen, but the individual has both distance and near vision correction requirements, the customized eyewear lens must accommodate both vision needs within a very limited space. As another example, if the customized eyewear lens is intended for use primarily while viewing a handheld device, the lens' transmittance and its proportion of near versus distance prescription areas may be quite different from a lens customized for distance sighting while sailing. The present invention provides efficient and practical methods of customizing these and other lenses by combining known ophthalmic lens manufacturing with innovative custom 3-D additive production techniques.

Unlike previous techniques that require grinding and surfacing of a lens to obtain the final optical properties, the invention adds material selectively to a previously-supplied lens substrate to create the customized lens. This advantageously eliminates the waste of removed material. Unlike other previous additive techniques, the invention's techniques for adding material do not require external shaping structures from which the product is removed. This is advantageous because it avoids the high initial costs of extra molds or high-quality optical forming surfaces, the fear of damage to these essential tools that would compromise subsequent molding and manufacturing, and the extra complication of processing with these additional tools.

The additive techniques of the invention comprise at least a change in the optical power of the lens substrate to a different optical power desired for the customized eyewear lens. The additive technique may also comprise other optical, chemical or physical changes between the lens substrate and the customized eyewear lens.

As an aid to understanding, FIGS. 1-6 provide examples of preferred embodiments to carry out the invention. To facilitate the description, any numeral identifying an element in one figure will represent the same element in any other figure.

A lens substrate, element 11 in FIG. 1, is obtained for use in the invention. Many lens substrates are available on the open market from eyewear lens manufacturers. It will be understood by those of skill in the art that the lens substrates can also be obtained by producing the substrates by various methods one's self or by contract manufacturing. Lens substrates can be manufactured by many different methods, including thermoset processes, thermoplastic injection or injection-compression molding, reactive injection molding, controlled material removal techniques to shape or polish an initial part, additive techniques to build a substrate, and other methods.

Lens substrates are designed to have at least some of the essential properties required for eyewear lenses, but may not be fully configured with all the attributes needed by the individual, or may not be of the final lens outline desired for mounting. Lens substrates may be flat, spherically curved or have simple or complex aspheric curvature. Their surfaces may contain discontinuities, such as stepped multifocal sections, or changing curvatures, such as progressive or lenticular features.

Examples of typical lens substrates include lens blanks that are made of materials and designs suitable for ophthalmic lenses, but are not in final form for a wearer's use. Lens blanks need to be further shaped or modified to produce a prescription or non-prescription optical power, or to fit within an eyewear frame. Many eyewear lens blanks have one surface that is curved or formed suitably for mounting in eyewear frames and supplying some ophthalmic attributes, but the other, opposite surface needs to be ground and polished to complete the full prescription power required by the individual wearer. Such eyewear lens blanks are known in the art as "semi-finished" lens blanks. "Finished" lens blanks have both surfaces prepared to provide specific spherical and cylindrical vision corrective optical power, but these blanks have diameters larger than most eyewear frames, such that they must be custom-edged down to the final shape and size needed to fit in an individual's chosen frame. Other lens substrates suitable for the invention include plano lens blanks, which have no vision corrective power but may include other eyewear attributes such as tint, polarization, photochromic response impact resistance, or other features the individual desires. Other lens substrates suitable for the invention include edged lenses or lens blanks that have been shaped to fit the final selected eyewear frame. Such edged lenses may have corrective vision optical power, or no power (plano).

Preferably, the lens substrate obtained will have at least some attributes desired by the individual for their final customized eyewear lens. These may be as basic as being of a plastic or glass material that will not deform unacceptably in the frame, or will not degrade too quickly in use. The lens substrate may also provide part of the vision correction desired (for example, distance correction, but not near add power). As other examples, semi-finished lens blanks may provide starting curvature(s) for preparing vision correction, or a lens curvature suitable for the frame configuration. The lens substrate may also include additional desired features such as, for example, polarization, tint, gradient tint, photochromic properties, blocking of ultraviolet (UV) or infrared light, light-absorbing particles, or electrochromic properties. The lens substrate may also comprise active display elements, sensors, transmitters, decorations, micro-optics or other features. The lens substrate may provide some physical properties desired, such as fundamental impact resistance, abrasion resistance, thermal stability, desired refractive index, or other attributes. The lens substrate may also comprise other elements such as films, wafers, inserts, embedded devices or other objects. They may also be shaped for specific frame shapes, or comprise holes, cut-outs, channels, grooves or other features to accommodate various frame mounting techniques.

However, in all instances, the lens substrate does not embody all the attributes desired for the final customized eyewear lens. The additive production techniques of the invention are used to provide additional customized attributes to the lens. This approach is desirable and useful because it means that a much more limited inventory of substrates can be stocked. This smaller inventory may comprise substrates that are less expensive (e.g., due to large volume routine manufacturing), and the invention is used to provide the more complicated, unique or costly attributes desired on an individual basis for the final lenses. In addition, another advantage of the inventive additive process is that it may accommodate lens substrates with poorer surface finish than typically required for finished ophthalmic or plano eyewear lenses; the inventive additive process can be used to smooth over some defects on the lens substrate while imparting the designed properties for the customized eyewear lens.

Some preferred lens substrates for the invention include finished lens blanks, semi-finished lens blanks, plano lens blanks, plano edged lenses and finished edged lenses.

The lens substrate comprises at least a first and a second surface, one of which will be positioned nearest the eye and one that will be positioned away from the eye when worn in the eyewear frame. In FIG. 1, the surface that will be positioned nearest the eye is the upper (concave) surface of element 11.

The lens substrate as obtained may comprise coatings or treatments on its surfaces. For example, one or both of its surfaces may be supplied with hard coats for improved abrasion resistance and/or chemical resistance. Other possible coatings include, for examples, conductive, polarized, photochromic, electrochromic, electro-active, hydrophobic, anti-reflective, UV or visible filters, or tints. Treatments may have been performed on the substrates to provide, enhance or change surface properties such as, for example, cleanability, adhesion to subsequent layers, crack resistance, chemical resistance, thermal stability, or other attributes. Such treatments can be applied by many known techniques, including plasma, corona, solution, solvent, vapor, and surface activation, among others. In a preferred embodiment, the lens substrate's surfaces may comprise treatments or coatings to enhance adhesion of subsequent layers, including adhesion to the added material(s) of the invention.

If desired, a surface, or one or more portions of a lens substrate surface, may be covered with protective material during part or all of the additive processing. For instance, for the method illustrated in FIG. 1, one may choose to protect the lower surface of element 11 (the surface of the lens substrate that will be farthest away from the eye when the customized eyewear lens is worn) such that the flowable radiation-polymerizable material contacts only one lens surface (in FIG. 1, the upper surface of 11). This option may be chosen when the added material design has been optimized and selected to modify only one surface; this can be a simpler approach than modifying two surfaces and may be advantageously chosen when a surface of the lens substrate already embodies certain optical or physical properties that should transfer directly to the customized eyewear lens. Several techniques can be used to protect the lens surface. For example, a thin sheet of protective plastic may be applied, loosely joined (e.g., by contact adhesive or static) or mechanically held against the other surface to protect it. As another example of protective materials, one surface of the lens substrate may comprise a protective coating or layer that may be removed after the added material design or a portion of the design is complete.

When the lens substrate has been obtained, produced or selected, the initial calculation and design activities are performed to create an added material design for the final customized eyewear lens. In one preferred embodiment of the invention, the final attributes intended for the customized eyewear lens, plus the characteristics of the lens substrate 11, are input for these calculations. Alternatively, the final customized eyewear lens properties may be used as input to select a lens substrate and then the calculations for the customized lens are completed based on that selection. The modifications that must be made to the lens substrate to arrive at the attributes of the final customized lens are calculated and converted to information on what added material is needed and how it should be positioned on the lens substrate surface(s) to achieve the modifications. The optimization and selection of the added material design includes factors such as what radiation-polymerizable materials are available; whether material(s) will be added to one or both surfaces of the substrate; and whether one radiation-polymerizable material or multiple different radiation-polymerizable materials will be used to form the added material. The optimization and selection of the added material design will also determine the position, thickness, and slope of added material on the customized eyewear lens.

Specifically, for the invention, it is expected that the lens substrate will not have the optical power properties desired for the customized eyewear lens. In one preferred embodiment, the lens substrate will have discernibly different optical power properties than the customized eyewear lens. As one non-limiting example, assume that the selected lens substrate is a single vision spherical finished lens with an optical power of −2 Diopters, while the customized lens requires a spherical distance optical power of −2 Diopters and an add power reading area 10 mm below optical center with an optical power of +3 Diopters. In a preferred embodiment, the optical power differences between the lens substrate and the customized eyewear lens will be discernible to the unaided eye. For instance, in this non-limiting example, one would see a marked difference when viewing a printed page through the lens substrate and through the customized eyewear lens.

In a preferred embodiment of the invention, the added material design is generated to convert the lens substrate's optical power to a discernibly different optical power as desired for the customized eyewear lens. In a further preferred embodiment, this discernible change in optical power may convert the lens substrate's optical power to the total optical power required for the final prescription of the customized eyewear lens. In another preferred embodiment, the added material design may convert the lens substrate's optical power to a discernibly different optical power for the customized lens that is not the final prescription required, but is intermediate toward those values and therefore simplifies further lens processing of the customized eyewear lens. This change to intermediate optical power may be particularly preferred when the lens substrate is a semifinished lens blank. A conversion of optical power by the added material design to intermediate optical power values may also be desired for the customized eyewear lens if it is anticipated that other specialized coatings or treatment of the customized lens will be performed. Thus, it is anticipated that the added material design of the invention will provide a discernible change in the optical power of the lens substrate, but may provide either all or a part of the total prescription power for the final customized eyewear lens.

In a further preferred embodiment, the added material design will not only convert the lens substrate's optical power to that desired for the customized eyewear lens, but will also provide other desired, customized properties for the customized eyewear lens. To provide additional customization, the added material design may be calculated and generated to include modification of optical, chemical and physical properties between the lens substrate and the customized eyewear lens. As non-limiting examples, the added material design may modify properties for the final customized eyewear lens such as polarization, photochromicity, UV transmittance, visible transmittance, light reflectance, hydrophobicity, chemical resistance, abrasion resistance, impact resistance, or electrical conductivity. As other non-limiting examples, the added material design may modify or optimize other optical properties such as prism, magnification, oblique aberration(s), power distribution at different locations on the lens, individual field of view, individual angle or position of view for near vision, decentration, back vertex distance, frame shape, eyewear frame wrap angle, eyewear frame tilt or other individually customized parameters. The added material design may be calculated and generated, and the radiation-polymerizable material used to form the added material may be selected, to provide one or more of these or other optical, chemical and physical properties desired for the individual's customized eyewear lens.

In a preferred embodiment, desired attributes for the customized eyewear lens, plus the characteristics of the lens substrate, serve as inputs for calculation of the added material design. The lens substrate's surfaces will be measured (e.g., by optical or physical metrology) or are known, and can be expressed by one or more equations, or described by a unique set of xyz coordinates. These equation(s) or coordinate values, along with the desired change in optical power and any other features that the added material design is intended to address, are then entered into calculation routines to optimize and define the total changes needed to convert from the lens substrate surface(s) to the customized eyewear lens. These calculations can be accomplished by many known techniques, including ray tracing, wavefront propagation analysis, curvature calculation, combinations of these techniques, and other techniques known to those of skill in the art.

As one example, the lens substrate surface (or surfaces) can be modeled mathematically as a sum of multiple, orthogonal Zernike polynomials, ordered according to the Wyant-Creath scheme; the coefficients of this surface representation become the input for the prescribed lens calculations. Calculations are then performed via exact ray tracing to incorporate this lens substrate information with the customized eyewear lens parameters, and determine the needed characteristics of the added material design that will satisfy the desired optical power requirement for the customized lens. As another example, the new surface that will be created for the customized eyewear lens (by the material added via the added material design) may be represented by a separate expansion of multiple Zernike polynomials. To achieve the customized lens' desired optical power, the design coefficients of this second Zernike polynomial expansion are found by minimization of a merit function that compares the actual power map at any stage of the computation with a theoretical power map. The optimization can be carried out using, for example, the BFGS (Broyden-Fletcher-Goldfarb-Shanno) optimization algorithm. Other calculation and optimization approaches will be recognized by those of skill in the art. Such calculations and optimizations to generate the added material design can be conducted using equipment or techniques such as computer systems, process control loops, digital calculators, optical design routines, manual calculations and the like.

Once the total amount of change that must be made to the lens substrate to arrive at the desired attributes of the customized lens is calculated, it is converted to details of how the material will be positioned on the lens substrate surface(s) to achieve the change. The added material design will be calculated and generated to add material selectively only in those areas where it is needed. This additive process represents a very different technique to create a customized eyewear lens. Previous approaches would approximate optical power needed for a prescription design by simple spherical and toroidal surfacing techniques, but were typically limited by hard tooling to discrete and rather large increments between power changes. More sophisticated techniques might employ various calculation and optimization steps, but then feed that information into computer-controlled surfacing equipment that again removes excess material from the lens substrate or lens blank, causing waste in the removal process. In contrast, the invention's techniques approach this problem differently, and innovatively add material selectively to achieve a customized lens, rather than removing material from an existing lens blank or block of material.

To generate the added material design, thickness, position and slope (angle) of added material relative to the lens substrate's surface(s) is calculated and optimized for realistic production applications. This may consider production considerations such as the accuracy of positioning the material, or reasonable production control limits for thickness and slope of added material relative to the lens substrate's surface(s). In addition, the calculation and generation of the added material design can include factors such as: whether material will be added to one or both surfaces of the substrate; whether one or more flowable radiation-polymerizable materials will be used; discrete values of thickness and slope of material at various positions on the lens substrate; what positions and added material parameters at those positions are most critical for the added material design, and acceptable max/min limits for the added material parameters. These factors may be determined and optimized at multiple locations across the lens substrate's surface(s) to provide a more precisely customized lens. Those of skill in the art will recognize other design factors that can be incorporated.

As an example of the calculations, first obtain by definition and/or measurements the values of the final desired surface for the customized eyewear lens, $Z_F(x, y)$, and the initial surface of the substrate, $Z_S(x, y)$, where z designated the height of the surface relative to an orthogonal X, Y coordinate plane. Then, at each design position (x, y) on the lens substrate, we need to build material between $Z_S(x, y)$ and $Z_F(x, y)$ to achieve the customized lens. The total height (thickness) of material to be built at each design position is $\Delta Z(x, y) = Z_F(x,y) - Z_S(x, y)$. These calculations allow one to generate the design details of position, thickness and if necessary, slope of the polymerized material to be added to the lens substrate.

In the invention, the controlled, selective irradiation of the flowable radiation-polymerizable material according to the added material design forms the added material on the lens substrate to convert it to the customized eyewear lens. Based on the added material design, at least a portion of one surface of the lens substrate is brought into contact with a bulk source of flowable radiation-polymerizable material. As will be described in more detail below, the flowable radiation-polymerizable material will be selectively irradiated in accordance with the added material design to convert it into the desired polymerized material on the lens substrate and thereby achieve the desired optical power for the customized eyewear lens (and optionally, provide other desired properties to the final customized lens).

Flowable radiation-polymerizable material is shown in FIG. 1 by element 21 and the dashed horizontal lines. A flowable radiation-polymerizable material will form a solid polymeric system when it is subjected to radiation with a specific range of properties including wavelength and energy density. For instance, the material may be engineered and formulated to be responsive to polymerization by ultraviolet radiation, but not infrared radiation. In another example, the radiation-polymerizable material may be selectively responsive to polymerization when irradiated at shorter UV radiation but not at longer UV wavelengths (e.g., 320 nm but not 365 nm). This selectivity of wavelength response allows more control of the reaction process and makes the flowable material less difficult to handle. By controlling the wavelength range, energy density and spatial distribution of the radiation, one can achieve the desired effect of polymerizing the material only in the area irradiated; by design, outside the area irradiated, there is insufficient energy to cause the material to react. The energy density can also contribute to control of the depth (thickness) of reaction and the time required for polymerization of the material.

Several different flowable radiation-polymerizable materials are known in the art of additive processing. Many are based on organic chemistry, but may include inorganic and metallo-organic species, too. The radiation-polymerizable materials suitable for the inventive process are described as flowable because they may exhibit a wide range of viscosities in their initial state, ranging from liquids less viscous than water to more gel-like materials. The flowable radiation-polymerizable materials may comprise monomers, oligomers, pre-polymers and other components that can affect the viscosity of the material as well as its optical, chemical and physical properties.

One distinct advantage of the invention's process is that the lens substrate may have certain necessary physical and optical properties for an ophthalmic eyewear lens that cannot be achieved simply with standard additive processing materials. Similarly, the added material of the invention by itself may not comprise all the attributes needed for the desired customized eyewear lens. For instance, the lens substrate may provide all or most of the structural stability needed to maintain lens power and integrity in the eyewear frame, while the radiation-polymerized added material may be applied in thin enough quantities that the lens substrate's structural integrity is not degraded, but additional features are added to the final customized lens. As another example, the added material that results from polymerization of the flowable radiation-polymerizable material may have slight residual color or may lack UV blocking that would render it unacceptable as a bulk lens material, but does not compromise performance in a thin layer. Thus, the added material may not have the same constraints on optical or physical properties as the lens substrate, but may be combined with the substrate to form a viable, customized eyewear lens.

In one embodiment of the invention, the added material formed by polymerization of the flowable radiation-polymerizable material may have the same optical and/or physical properties as the lens substrate. In this instance, the added material can be used to refine the optical or physical performance of the lens substrate. For example, the added material may create certain select areas of greater thickness or higher curvature, corresponding to additional optical power in those regions of the final eyewear lens. In another example, the added material can be used to smooth over defects, discontinuities or irregularities on the lens substrate.

In another preferred embodiment, the flowable radiation-polymerizable material has measurably different optical or physical properties from the lens substrate, or upon polymerization, forms added material with measurably different properties from the lens substrate. For example, consider the situation mentioned previously of the individual having both distance and near vision correction requirements but selecting a very narrow frame. The invention could use a lens substrate that satisfies the distance prescription, and a flowable radiation-polymerizable material that produces an added material of significantly higher refractive index, such that the added material provides the near add power with a thinner construction than a lens made with only one refractive index. In addition, the added material can be positioned specifically to provide add power only in the areas of the lens that will be needed in the small frame. As another example, for the lens mentioned previously that is customized for distance sighting while sailing, the added material could provide polarization to block glare from the water, thus ensuring better comfort and clarity of vision.

In one preferred embodiment, the measurably different properties for the added material formed from the radiation-polymerizable material are selected from refractive index, Abbe value, abrasion resistance, impact resistance, resistance to organic solvents, resistance to bases, $T_g$, visible color, visible transmittance, UV transmittance, IR transmittance, light reflectance, hydrophobicity, electrical conductivity, polarization or photochromic properties.

In addition to the radiation-polymerizable material itself having different properties than the lens substrate, the flowable radiation-polymerizable material may comprise components to tailor the optical or physical properties of the customized eyewear lens. For example, components may comprise photo-initiators, thermal initiators, UV absorbers, UV reflectors, infrared reflectors, infrared absorbers, visible tints, dyes, pigments, photochromic agents, thermochromic agents, electrochromic agents, polarizers, thermal stabilizers, electrically conductive materials, liquid crystal materials, active or passive polarization materials, light absorbing particles, light reflecting particles, agents that affect surface tension, and particles or materials that increase the impact resistance or abrasion resistance of the radiation-polymerizable material. In addition, components such as decorations, micro-optics, sensors, transmitters, displays and other small devices may be added to the radiation-polymerizable material. One or more of these components may be combined within the radiation-polymerizable material. Such components, depending on their nature, may be dissolved, dispersed, suspended, embedded, encapsulated, or otherwise carried within or associated with the flowable radiation-polymerizable material.

To form the added material design on the lens substrate, one or more surfaces of the lens substrate are brought into contact with a bulk source of the flowable radiation-polymerizable material. The flowable radiation-polymerizable material may contact an entire surface, or only be added to a portion of a surface. For example, as mentioned in the illustration of the individual having both distance and near vision correction requirements but selecting a very narrow frame, the flowable radiation-polymerizable material could contact only the area of the lens surface used for near vision viewing, and the resultant added material provide extra add power only in that region. The added material may also be patterned or discontinuous. These could be useful for example, if an active display or a decorative design is being created on the customized eyewear lens.

Some exemplary methods of bringing the lens substrate into contact with the flowable radiation-polymerizable material are known in the coating industry. Methods may be selected for ease of application, production utility, versatility, cost, availability and other manufacturing considerations. In one preferred embodiment, only one surface of the lens substrate contacts the flowable radiation-polymerizable material. Single surface contact methods may include spin, spray, roller, blade and curtain coating. If desired, the other surface of the lens substrate may be covered or protected with a protective material to keep radiation-polymerizable material from inadvertently contacting it. For example, a thin sheet of protective plastic may be applied, held by static or contact adhesive, or mechanically held against the other surface to protect it. As another example of protective materials, one surface of the lens substrate may comprise a protective coating or layer that may be removed after the added material design is complete.

In many instances, the lens substrate may have a configuration such that one surface is concave and the other surface is convex. In theory, either surface can be brought into contact with the flowable radiation-polymerizable material. The practical decision on which surface to use can be based on many factors and provided as input or further optimized in the design program. Examples of some of the factors to consider include coating or additive processing equipment capabilities and limitations; viscosity, homogeneity and uniformity of the flowable radiation-polymerizable material; desired layer thickness; curvature, contours, stepped or discontinuous features of the lens substrate and of the added material design; and cosmetic, optical and structural requirements of the final customized eyewear lens.

In a preferred embodiment, both the first and second surfaces of the lens substrate contact the flowable radiation-polymerizable liquid material, either simultaneously, or sequentially.

One preferred embodiment for simultaneously contacting both surfaces of the lens substrate with the flowable radiation-polymerizable material is dip coating or dipping the substrate into a bulk source of the flowable material such that it is partially or totally submerged. Dip coating equipment may also be used to apply the radiation-polymerizable material to only one surface of the lens substrate if the other surface is covered or protected.

In a preferred embodiment of the dipping process, the angle and position of the lens substrate is controlled relative to the flowable radiation-polymerizable material while the substrate is brought into contact and moved while in contact with the liquid material. A preferred method to control the angle and/or position of the lens substrate is to use a lens substrate support, as indicated by element 70 in FIG. 1. Such orientational control will assist in controlling the position and thickness of the added material, particularly on a curved lens substrate surface.

The lens substrate may be held by support 70 in a stationary position during contact with the flowable radiation-polymerizable material. In another preferred embodiment, the lens substrate support 70 moves the lens substrate in a controlled fashion with respect to the flowable radiation-polymerizable material while contact is being made. Such movement can be limited to one axis, or allow variation in multiple axes. In addition, the movement may include both translation and rotation of the lens substrate relative to one or more axes.

One preferred orientation and direction of movement of the lens substrate with a dip coating arrangement is illustrated in FIG. 1. The typical method of dipping a part is to have it enter perpendicular to the liquid level. In contrast, the preferred invention is to have the lens substrate 11 enter the bath of flowable radiation-polymerizable material 21 and move at a shallower angle for more control and more area of contact between the lens surface and the liquid meniscus. As indicated in this preferred embodiment, substrate 11 mounted in its support 70 can be moved with the following directional controls: rotation of the lens around the X-axis (an angular motion, designated for convenience as angle α, around the axis perpendicular to the plane of the figure, i.e., coming out toward the viewer), movement in the Y-direction (the horizontal direction in FIG. 1), movement in the Z-direction (the vertical direction in FIG. 1), and simultaneous change of any combination of these factors. One or more combinations of these directional controls of the lens substrate position and movement are preferred when methods other than dipping are used, too. In addition, in a preferred embodiment, the rate of movement in any axis or combination of axes (including angle of contact with the liquid) can be changed or reversed during the time the flowable radiation-polymerizable material is in contact with the lens substrate. In addition to changing the rate of movement, the movement itself may be continuous or stepped, or alternate between continuous or stepped at different times during the process of adding material to the lens substrate. Controlling the angle, speed and/or direction of movement of the lens substrate, in addition to the ability to vary these parameters while the radiation-polymerizable material is being contacted, provides added advantages to change the thickness of the resultant added material, correct for errors or accommodate previous features on the surface. An additional benefit is that such controlled movement of the lens substrate can also be used to smooth defects or edges of added material as it is being formed the lens substrate.

An exemplary lens substrate support 70 is shown in FIG. 1, but several support mechanisms are known to those of ordinary skill in the art. For example, the lens substrate may be held or supported at its edges by a continuous holder, by a discrete edge grip, or by one or more point supports. FIG. 1 illustrates a lens substrate support 70 with edge grips on at least a portion of opposite sides of the lens substrate. As another example, if it is desired that only one surface of the lens substrate will contact the radiation-polymerizable material for the formation of the added material design, the lens substrate may be supported on at least a portion of its other surface by vacuum, adhesive or other physical mounting techniques. As mentioned previously, the other lens substrate surface may also be covered with protective material to maintain its original surface characteristics.

In FIG. 1, translational and rotational control and movement of the lens substrate via an exemplary lens substrate support 70 is illustrated with respect to a dip coating or dipping process, but rotational and/or translational movement and control of the lens substrate is applicable to other methods of supplying the added material, too. For example, the same type of lens substrate movements may be suitable for spray or curtain coating systems. In addition, other combinations of rotational/translational movement(s) may be suitable in combination with various methods for contacting one or more surfaces of the lens substrate with a bulk source of the flowable radiation-polymerizable material(s) while forming the added material design.

Alternatively, or in addition to the lens substrate movement, the flowable radiation-polymerizable material may be in motion while it contacts the lens substrate. As non-limiting examples, when a liquid bath is used, the liquid may be agitated mechanically or subjected to ultrasonic energy or gas flows to cause movement in the bulk of the liquid material, or on the liquid surface. Such movement may be preferred to lessen sharp or stepped edges when the liquid is applied and polymerized.

In a preferred embodiment, the environment around the lens substrate and the flowable radiation-polymerizable material is controlled during liquid layer application. In one preferred embodiment, an oxygen-depleted or inert atmosphere (e.g., argon or nitrogen) is used in the vicinity of the coating equipment. As an example, the atmosphere may be controlled over the tank or the exposed volume of flowable material used during dip coating. In another preferred embodiment, the relative humidity of the atmosphere is controlled to lessen unwanted water condensation, side reactions or haze of the radiation-polymerizable material. In another preferred embodiment, the temperature in the vicinity of the coating equipment and/or the temperature of the flowable radiation-polymerizable material are regulated to prevent or lessen changes in viscosity or control reaction rates. In another preferred embodiment, the atmosphere is controlled or filtered to reduce particulates or contaminants.

In another preferred embodiment, the flowable radiation-polymerizable material may be held in a holding tank or reservoir prior to and during the liquid material application. The flowable radiation-polymerizable material may be filtered to reduce unwanted particulate formation. In another preferred embodiment, the flowable radiation-polymerized material is circulated or agitated to help maintain consistency, especially when solid additives or particles are present in the material. In another preferred embodiment, the flowable radiation-polymerizable material is monitored and controlled for solids content, viscosity, color or other physical properties. In other preferred embodiments, the flowable radiation-polymerized material and/or its container may be controlled for temperature, humidity and exposure to atmosphere or other gases.

Uniquely, the invention builds a customized eyewear lens by starting with a lens substrate, contacting it with a bulk source of flowable radiation-polymerizable material, and by selective irradiation, producing polymerized material only in designed positions, thicknesses and slopes to create desired and different optical power properties. This is in contrast to a multi-layered approach of additive processing, where successive layers of material are discretely applied and polymerized before the next layer is applied. It is also distinct from standard 3-D printing, in which small amounts of material are selectively printed onto small areas of a surface (or onto a removable temporary support or a molding optic); cured; and then an additional amount of material deposited (printed) onto another small area to continue to enlarge a feature. These 3-D printing techniques minimize the amount of new material in contact with the surface or support during formation of the feature and typically try to convert all the applied material present into a printed feature. In contrast, the invention's technique provides a relatively large reservoir or bulk of flowable radiation-polymerizable material, but only allows polymerization of a controlled, selected portion of the bulk via selective irradiation according to the added material design. The inventive technique is also distinct from previous methods in which a separate mold was used to define a new profile relative to a lens surface, filled with liquid-phase material and then cured against the lens to create a new feature on that surface. The invention specifically does not require a mold to define or build the new feature(s). Neither does it require a temporary platform, support or external shaping structures on which to build a part that will be subsequently removed from that platform, support or shaping structure. Instead, the invention's methods create the new features of the customized eyewear lens directly on a lens substrate, by putting the lens substrate into contact with a bulk source of flowable radiation-polymerizable material, and then using controlled irradiation to convert (polymerize) a portion of a bulk source of flowable material only in selected areas relative to the lens substrate.

FIG. 1 shows one example of a method for this selective irradiation of the radiation-polymerizable material to form the added material design. An irradiation assembly 30 outputs an irradiating beam 31 that is directed through the flowable radiation-polymerizable material 21 to form the added material 51 desired for the customized eyewear lens. As one example of an irradiating beam, FIG. 1 illustrates a collimated beam of light for element 31; other irradiation configurations will be understood to be within the scope of the invention. For example, other irradiating beams 31 may be focused, divergent, pulsed, chopped, oscillating, or comprise other optical configurations. One or more irradiating beams may be directed at the flowable radiation-polymerizable material and/or the lens substrate simultaneously, and the multiple irradiating beams may be coincident, coaxial, partially or fully overlapping, or directed at different locations relative to the surface(s) of the lens substrate. Irradiating beams may also be directed at the flowable radiation-polymerizable material sequentially at the same position, or different spatial positions relative to the lens substrate to achieve the added material design.

In a preferred embodiment, the irradiation assembly 30 may be mounted on an irradiation support device 60 that allows movement or maintains the irradiation assembly (and its irradiating beam) in a fixed position relative to other elements of the additive processing equipment. As one example, in FIG. 1 the irradiation support device 60 allows movement in the X, Y, and Z directions. In a preferred embodiment, the movement of element 60 along the X and Y axis can be oscillatory, with small amplitude and a frequency high enough to filter any possible unwanted structure in the resultant radiation pattern of the irradiating beam emitted from the irradiation assembly. This type of irradiation support device 60 is one preferred embodiment when the irradiation assembly uses a digital light processing (DLP) projector to shine the required irradiating beam on the flowable radiation-polymerizable material 21. This 2 D-vibration could even be optimized to smooth not only the spaces between pixels, but also the final surface.

In other preferred embodiments, irradiation support devices may comprise fixed mounting systems relative to the lens substrate, the flowable radiation-polymerizable material or other elements of apparatus used to effect this selective additive processing. Other exemplary irradiation support devices may comprise controls to allow rotational, translational or other movements either sequentially or in combination. The irradiation support devices may operate independently of any lens substrate support systems. In other preferred embodiments, the irradiation support device 60 and the lens substrate support 70 may be linked or coordinated either to move as one unit, or to move in a controlled fashion relative to each other.

In yet another example of control and movement of the irradiating beam, the irradiation assembly can incorporate rotating mirrors to direct the irradiating beam 31 to scan the selected area that should be irradiated for polymerization of the flowable material 21 onto the lens substrate's surface. In a preferred embodiment, oscillatory motion of irradiating beam(s) may be accomplished with moving mirrors or prisms associated with the irradiation assembly that vibrate at a frequency much higher than the inverse of the characteristic polymerization cure time for the flowable radiation-polymerizable material 21. This may be particularly preferred when the irradiation assembly comprises a DLP projector or pixel array, so that one can blend the images from individual pixels and smooth the structure of the irradiating beam(s). In another preferred embodiment, the irradiation assembly 30 comprises other position-adjustable optics that may be controlled or moved during the inventive additive process to move the irradiating beam or change its energy or spatial properties.

In the example of FIG. 1, the lens substrate 11 is moving downward into the bulk of the flowable radiation-polymerizable material, and toward the right in the drawing, as indicated by the open-ended directional arrows near the lens substrate surface. The portion of added material 51 to the right of the irradiating beam 31 is shown with horizontal hatch marks to indicate that this volume of material has been selectively polymerized onto the concave surface of the lens substrate 11. The cross-hatch pattern within the beam area 51a identifies flowable radiation-polymerizable material that is being subjected to selective irradiation by source 31, to convert it into added material. Note that a significant depth and volume of material is undergoing this selective polymerization. Another feature and benefit of the invention is illustrated in FIG. 1: the contoured shape of added material 51 shows an example of how the irradiation and polymerization is controlled in the invention to provide added material only in selected areas and with selected slope and thickness, as dictated by the added material design.

In the invention, the controlled, selective irradiation of the flowable radiation-polymerizable material according to the added material design forms the added material on the lens substrate to convert the lens substrate into the customized eyewear lens. The selectively added material is designed to create at least the desired conversion of the lens substrate's optical power properties into the customized eyewear lens' optical power properties and may convert or add other physical or chemical properties to the customized lens, too.

The irradiation conditions are selected and implemented with specific reference to the added material design, the particular flowable radiation-polymerizable material used, the lens substrate, the position, orientation and any planned movement of the lens substrate, and the position, slope and thickness of the flowable radiation-polymerizable material to be polymerized onto the lens substrate. Importantly for the invention, irradiation conditions will be controlled to selected areas of the flowable radiation-polymerizable material. While this may encompass extended areas or volumes within the bulk of the flowable material, it is preferred that only discrete areas of the material 21 being irradiated and selectively polymerized by that irradiation. As an example, the entire lens surface may be in contact or submerged in a reservoir of flowable radiation-polymerizable material, but the irradiation may be selectively controlled to form the polymerized added material on the lens substrate only in a dotted line, alignment marking pattern of 2 mm dots at a spacing of 5 mm across the diameter of the customized eyewear lens. As another non-limiting example, the irradiating beam may be selectively directed through the bulk of flowable radiation-polymerizable material with a wavelength range and energy density sufficient to form the polymerized added material only over an oblong section 10 mm wide and 20 mm long on the lens substrate surface, to create a reading zone of added material on the customized eyewear lens.

The irradiating beam 31 is directed into the bulk of flowable radiation-polymerizable material with sufficient control of position and irradiation conditions that the polymerization process is limited only to the areas directly and selectively irradiated. This may include controlling conditions such as the time of exposure, sequence of exposure, number of exposures, depth of focus, degree of focus or collimation, energy density, wavelength range, and penetration of the irradiation into the bulk of the material. This is what is meant by irradiating selectively. Such controls are used to better define the specific area or volume of polymerization. These controls allow distinct advantages over previous methods that resulted in general polymerization of either an entire liquid layer or the mass of radiation-polymerizable material by energy transfer outside the irradiated area.

In a preferred embodiment, the substrate position, angle and movement are controlled during irradiation to provide further control of the selective polymerization of the flowable radiation-polymerizable material. Such control may be effected by use of the orientation, position and movement controls of the lens substrate support, by maintaining the lens substrate in a fixed mounted position while the irradiation assembly and/or the irradiating beam is moved, or by combinations of movement of the lens substrate and the irradiation assembly and/or the irradiating beam.

Another important consideration for the invention is that the added material must adhere well to the lens substrate and to other areas of added material (if they exist), and not degrade the optical performance of the lens. This is important to maintain the usefulness of the customized eyewear lens and not shorten its lifetime. Delamination, peeling and cracking of coatings or layers in ophthalmic lenses have often been historical problems, especially when new technologies are introduced. The stresses and widely varying thermal, physical and chemical exposures to which eyewear lenses are subjected (during initial component processing, eyewear assembly or in use by the wearer) can place unexpected and severe demands on adhesion and integrity of a layered lens structure. Therefore, the polymerized added material must be integrally bonded to the lens surface. Integrally bonded means that the added material is chemically bonded or strongly physically bonded to the previous surface and/or areas of added material such that the combined structure remains intact and without damage discernible to the unaided eye both during normal lens processing and in its normal use as an eyewear lens. The irradiation conditions are selected and administered to ensure that the inventive process will achieve such integral bonding.

In a preferred embodiment, a combination of irradiation properties selected from the radiation wavelength or wavelength range, radiation energy density, and spatial distribution of the irradiating beam are controlled or chosen to suit the physical and chemical properties of the particular radiation-polymerizable material, and the depth or volume of added material that must be formed at a specific location on the lens substrate. Several exemplary irradiation parameters that can be controlled are described above, and are known to those of skill in the art. In addition, how the flowable radiation-polymerizable material is subjected to the irradiation may be selectively controlled by changing the irradiation properties of element 31, by moving the lens substrate, by moving the irradiation assembly and/or the irradiating beam, or by combinations of these techniques. Examples illustrating such control and movement mechanisms are described above, and other techniques within the scope of the invention would be recognized by those of skill in the art.

Depending on the added material design and the polymerization requirements, different types of radiation sources may be selected, including monochromatic sources, lasers, actively or passively wavelength-filtered sources, LEDs, blackbody sources, atomic emission lamps, fluorescent lamps and other sources known in the art. The frequency of the irradiating energy may be in the UV, visible or infrared range, or in other energy ranges including microwave, radio-frequency, gamma, and X-ray radiation. Thermal energy can even be used if properly controlled for selective irradiation.

In a preferred embodiment, the radiation used to irradiate the flowable radiation-polymerizable material is selected from microwave, radio-frequency, ultraviolet, or visible energy. In another preferred embodiment, a more limited wavelength range within the UV or visible energy spectrum is used to irradiate the flowable radiation-polymerizable material. In one preferred embodiment, energy in the blue wavelength range of the visible spectrum is used for irradiation. In another preferred embodiment, UV energy in the range of 350-380 nm is used to irradiate the flowable radiation-polymerizable material.

In another preferred embodiment, two-photon polymerization is used in the irradiating beam(s). For example, one wavelength of light may stabilize the flowable radiation-polymerizable material, but it is not until it is subjected to a second photon of different wavelength (or energy) that the material polymerized to created added material on the lens substrate. In another example, a first photon may start the polymerization, but it is not until the flowable radiation-polymerizable material is subjected to a second photon that sufficient energy occurs to complete polymerization. In another preferred embodiment, one photon could activate an initial reaction, while the second photon enables a secondary reaction pathway for a preferred polymerization result.

Figure 3:
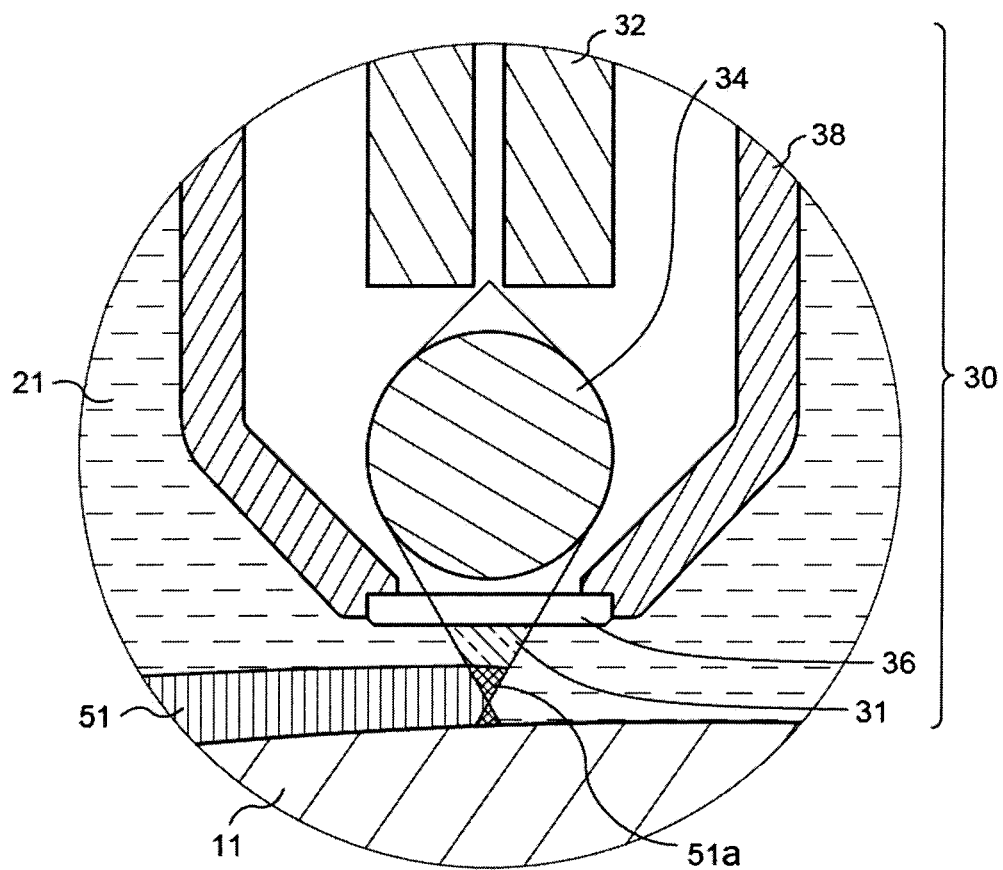
FIG. 3 is an expanded view of the irradiation assembly, the irradiating beam, the contact area of flowable radiation-polymerizable material and the lens substrate, and the added material produced by the method of FIG. 2.
Figure 4:
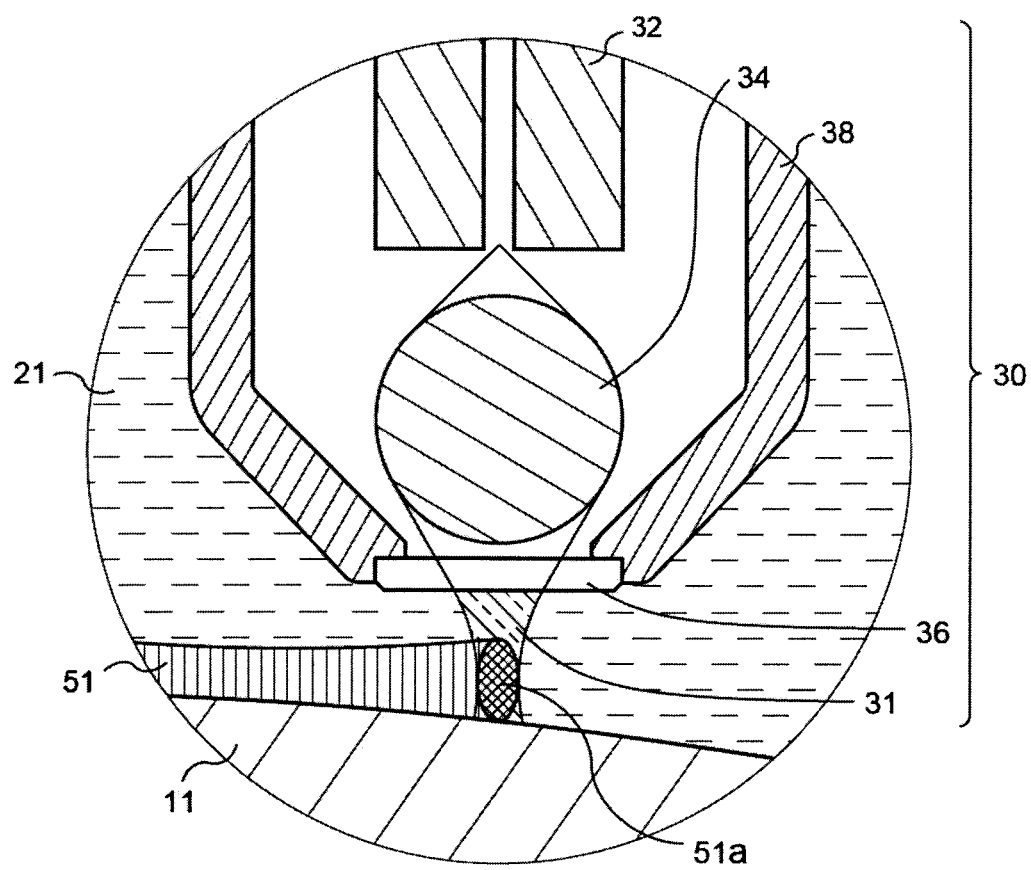
FIG. 4 is another expanded view of the irradiation assembly, the irradiating beam, the contact area of flowable radiation-polymerizable material and the lens substrate, and the added material produced by the method of FIG. 2, but at another time interval within the process.

Two-photon polymerization can also be used with a focused irradiating beam to polymerize the resin, such as illustrated, for example, in FIGS. 3 and 4. Often with two-photon polymerization, the full reaction will only occur when the intensity of incoming radiation is above some threshold. In a preferred embodiment, one can then create a precise region near the focus of the irradiating beam where the irradiance is above the threshold, and only in this select area is polymerization achieved. Outside this region near the focus, the flowable radiation-polymerizable material remains flowable.

In another preferred embodiment, the blue channel (B) energy of an (R, G, B) (Red-Green-Blue) projector is used to selectively irradiate the flowable radiation-polymerizable material.

Other light projectors may also be used. These may include projectors with both UV and visible light, or projectors using several visible wavelength ranges or different color channels. The projectors' light sources may include laser diodes, discrete multiple sources at different wavelength ranges, filter wheels on single sources and other techniques known in the art. Typically, three or more wavelength ranges are available in most projectors and one or more of these wavelength ranges may be used for selective irradiation in the present invention.

In another preferred embodiment, a digital light processing (DLP) projector that uses a UV light source may be used for irradiation of a suitable radiation-polymerizable material. In another preferred embodiment a DLP with one or more visible light sources, or with both UV and visible light sources, may be used.

In another preferred embodiment, the DLP projector could be replaced by a scanning laser beam, using a visible or UV laser source and a mirror oriented using piezoelectric actuators. In another preferred embodiment, one or more lasers are used for irradiation; in another preferred embodiment, one or more light-emitting diodes are used for irradiation.

The flowable radiation-polymerizable material may be directly irradiated by the source, or the energy may be filtered, pulsed, chopped, time sequenced, or reflected or transmitted through other controlling optics before reaching the radiation-polymerizable material. The irradiating energy may be concentrated into a narrow beam, collimated, focused or expanded by optics to create a beam energy, spatial profile, depth of focus or other irradiation attributes controlled for the inventive process. It may also be presented in a more diffuse irradiation pattern, or in a structured pattern to further control the selectivity of the positioning the added material for the customized eyewear lens. For example, with a DLP or an array of light sources, pixels or sources may be controlled individually to illuminate specific, discrete areas on the lens substrate, or to control irradiance.

In a preferred embodiment, the area of irradiation of the flowable radiation-polymerizable material is controlled for distance relative to the lens substrate, and the substrate surface or surfaces to which material is being added. This may be accomplished by moving the lens substrate relative to the irradiation, changing the irradiation area (e.g., by beam focus or physical movement of the irradiating beam) or by a combination of such techniques. In another preferred embodiment, the angle at which the irradiation polymerizes the flowable radiation-polymerizable material and/or the angle of the irradiation versus the lens substrate's surface is controlled and may be adjusted to facilitate the added material design. Such angle adjustment and control can be achieved by various methods, including changes in the angle $\alpha$ of the lens substrate as discussed in the exemplary embodiment of FIG. 1, changes in the X-Z position of the lens substrate, other positional changes of the lens substrate during the irradiation that provides the added material design, changes in focusing or directing optics associated with the irradiation assembly or the irradiating beam, physical movement of the irradiation assembly or the irradiating beam, changes in the emitted energy of the irradiating beam, and other techniques.

In a preferred embodiment, the irradiating beam and/or the lens substrate may move relative to each other. Such movement and the control of these movements may be additional factors used in the added material design and in the control of the selective irradiation process. Control and/or movement of the irradiating beam may be accomplished by adjusting wavelength, energy, focus or other radiation factors. In another preferred embodiment, either or both of the irradiation assembly and the irradiating beam can be physically positioned, moved or oriented relative to the flowable radiation-polymerizable material or the lens substrate during the added material process.

One preferred use of such control and/or movement of the irradiating beam, either alone or in combination with controlled positioning and movement of the lens substrate, is to smooth defects or edges as the flowable material is irradiated and the added material is formed. As an example, a selected area of the flowable radiation-polymerizable material may be irradiated to form polymerized added material on the lens substrate in the irradiated area. Then the edges of that area, and optionally, some additional material beyond the originally irradiated area, may be irradiated again, but with a different energy or spatial distribution to smooth the edge or create a gradual slope toward the lens substrate at the edge of the added material. As another example, multiple exposures could be used to allow time for the radiation-polymerized reaction to proceed, to ensure that sufficient energy is absorbed to complete the reaction, or to strengthen the integral bond of the polymerized added material to the lens substrate.

The selective irradiation methods of the invention may provide added material to one or both surfaces of the lens substrate, and this is another option that may be selected during the calculation of the added material design. Several methods can be used to control exposure of one or more lens substrate surfaces' to the flowable radiation-polymerizable material, and to control the selective irradiation process. As mentioned previously, protective material may be applied to keep a surface or an area of a surface from being contacted by the flowable radiation-polymerizable material; protective materials may also function as absorbers or reflectors of the irradiation, to either limit or enhance the polymerization processes, respectively. Another preferred method is to carefully control the irradiating beam's properties, such as depth of focus, energy distribution in the area of irradiation, energy dose, and effective wavelengths (those capable of causing polymerization) to improve the selective irradiation process. The substrate itself may participate in the control of the irradiation. For example, the material of the lens substrate may absorb the irradiation energy sufficiently that no radiation-polymerization can occur, even if the flowable material is in contact with the substrate's opposite surface. In another example, the lens substrate may comprise reflectors or absorbers that limit exposure of the opposite surface to effective irradiation for polymerization; this could include, for instance, reflective mirror coatings, or embedded reflective or absorptive layers. Support systems that only expose one surface of the lens substrate to the bulk of the flowable radiation-polymerizable material may also be employed, such as systems wherein the lens substrate comprises part of a wall of the container for the flowable material, or when the flowable material is only introduced against one surface of the lens substrate.

Optionally, one may measure or detect the lens substrate, to confirm its surface properties, orientation, mounting or other characteristics. In a preferred embodiment, the lens substrate properties and its position or movement during deposition of the added material will be factors in the added material design. The lens substrate's surfaces will be measured (e.g., by optical or physical metrology) or known, and can be expressed by one or more equations, or described by a unique set of XYZ coordinates.

During processing according to the added material design, it may be desired to interrogate the localized properties of the added material in order to determine if the measured modifications are within the expected tolerances, or whether adjustments or revisions need to be made to the added material design. In an alternative embodiment, this may include interrogating the localized properties of the flowable radiation-polymerizable material that is in contact with the lens substrate to determine if changes need to be made, for example, to the added material design or to the selective irradiation of the radiation-polymerizable material. Such monitoring may occur periodically, continuously or at discrete times during the processing according to the added material design.

FIG. 1 shows a sensing element 41 that may be used to monitor the position of the lens substrate, the irradiation area and/or the added material being formed. Exemplary sensing elements include CCD cameras, interferometric detectors, transmitted or reflected light detectors, and other measurement devices. The sensing element can also be configured to use deflectometry, Moiré pattern comparison, Shack-Hartmann wavefront sensor techniques, or triangulation techniques to monitor and measure the inventive process.

In a preferred embodiment, the optional sensing element may be used to assess the proper processing according to the added material design, determine errors in processing, and refine or optimize the design (if required, based on the errors detected) to achieve the optical power (and optionally, other property changes) desired for the customized eyewear lens. The sensing element's measurements may be used to check that the flowable material is behaving as expected, that the lens substrate is in the expected position and orientation for the added material design, and that the added material is being formed as expected and needed for the added material design. For example, one may expect the flowable material to create a slight meniscus on the lens substrate. These optional measurements can check whether the meniscus is occurring as expected, or if the liquid's interactions with the surface are creating a different profile.

In preferred embodiments, the added material, the lens substrate, and the flowable radiation-polymerizable material may be measured during the added material design process, and information from such measurements can be used to confirm or revise the added material design to achieve the changes desired for the customized eyewear lens.

The preferred sensing elements or measurement devices can supply information or direct data about one or more of the following parameters: position and orientation of the substrate; position, local slope, and local height (thickness) of the added material; position, slope, thickness of the flowable radiation-polymerizable material with respect to the lens substrate; optical power of the lens substrate; optical power of the added material; optical power of the combined added polymerized material and lens substrate; and features or impurities in the flowable material or in the added, polymerized material. These measurements, or values derived from the measurements can be compared with the added material design, or can be used as inputs to calculate what optical power or other optical change (e.g., transmittance, polarization) was achieved with the added material on the lens substrate. Preferably, measurements are conducted at several discrete points, or over an extended area of interest relative to the lens substrate. Alternatively, data can be obtained along a line or multiple lines measured across the lens substrate or the added, polymerized material.

If these optional measurements are used and errors greater than expected are measured, the information is compared to the added material design, and calculations are made to correct for the errors or differences. The added material design, or its method of execution, is revised based on these calculations to alter where or how the material is polymerized such that the desired modifications of the lens substrate to the customized eyewear lens properties can still be achieved. For example, calculations may direct adjustment to the irradiation conditions that will be subsequently applied to the flowable radiation-polymerizable material. For example, if the added material as measured was thicker than expected, more energy or more exposure time may be required to polymerize the full thickness of the material. In addition, if the added material is thicker than expected at a given position, the relative slope, thickness and/or position of adjacent added material may be adjusted to continue with the desired changes for the customized eyewear lens, without generating an unacceptable cosmetic or optical defect due to height differences on the added material. Conversely, if measurements indicated that the polymerized added material was thinner than expected, the lens substrate may be subjected to further contact with the flowable radiation-polymerizable material (and additional irradiation) at that same position, in order to allow more material to be added. In another example, if measurements showed that material was added inadvertently at positions that were not specified by the original design, calculations based on the measured optical properties of the added material or its combination with the lens substrate would indicate whether and what corrective actions should be taken.

In one preferred embodiment, a camera is mounted at a different, known, fixed position relative to the irradiation light source and used as the sensor element to provide measurements at various times during the added material design, as shown in FIG. 1 by camera 41. In this example, the camera may view the added polymerized material 51 through the flowable material, the reacting material in the area of irradiating beam 31 (the cross-hatched area 51a), and/or the flowable radiation-polymerizable material 21 in contact with the lens substrate.

In another preferred embodiment, an (R, G, B) projector is used in the irradiation assembly 30, and the blue light of the projector operates as the irradiating beam. In this embodiment, the flowable radiation-polymerizable material is not affected by the red or green light of the projector. Instead, a camera acting as the sensor element uses the red and green channels of the projector as its light sources to measure the optical properties of the added material and its three-dimensional shape relative to the lens surface.

Other examples and information about sensing techniques are described in the inventors' related co-pending application Ser. No. 14/226,686, which are incorporated herein by reference, and are known to those of skill in the art.

The sensing elements' measurements can be compared with the calculated results that would be expected for the particular location and time of the measurement relative to the lens substrate and the stage of completion of the added material design. If the flowable radiation-polymerizable material is being probed (either in addition to or adjacent to the added polymerized material), care must be taken to account for differences in the properties of the flowable material 21 versus the polymerized added material; these may have different indices, thicknesses and slopes, for example. Corrections or accommodations can be included and will help determine, for example, if the added polymerized material has been formed at the expected position on the lens substrate's surface and at a sufficient thickness.

In a preferred embodiment, the sensing element measures the polymerized added material to determine its localized position, thickness, slope and/or optical power in relation to the surface of the lens substrate. In another preferred embodiment, optical through-power or other transmitted light properties (e.g., light transmittance, polarization, photochromicity, UV absorbance, etc.) may be measured to determine how the added material has changed the lens substrate's optical properties. In one preferred embodiment, measurement(s) of the lens substrate surface(s) are used in combination with measurements on the added material for reference and for localized comparisons.

The same or different measurement technique(s) may be used for evaluation of flowable radiation-polymerizable material and polymerized added material. The same or different measurements techniques may be used at different times during the added material design, or at different locations relative to the lens substrate surface. In a preferred embodiment, multiple techniques may be used for measurement as the added material design proceeds. As one non-limiting example, surface reflectance techniques may be used to measure and calculate error during initial additive processing, but transmittance measurement techniques may be used as one nears completion of the added material design to check the optical through-power of the lens (that is, the combined optical power change resulting when light is directed through the lens substrate and the added material formed on the lens substrate).

Figure 2:
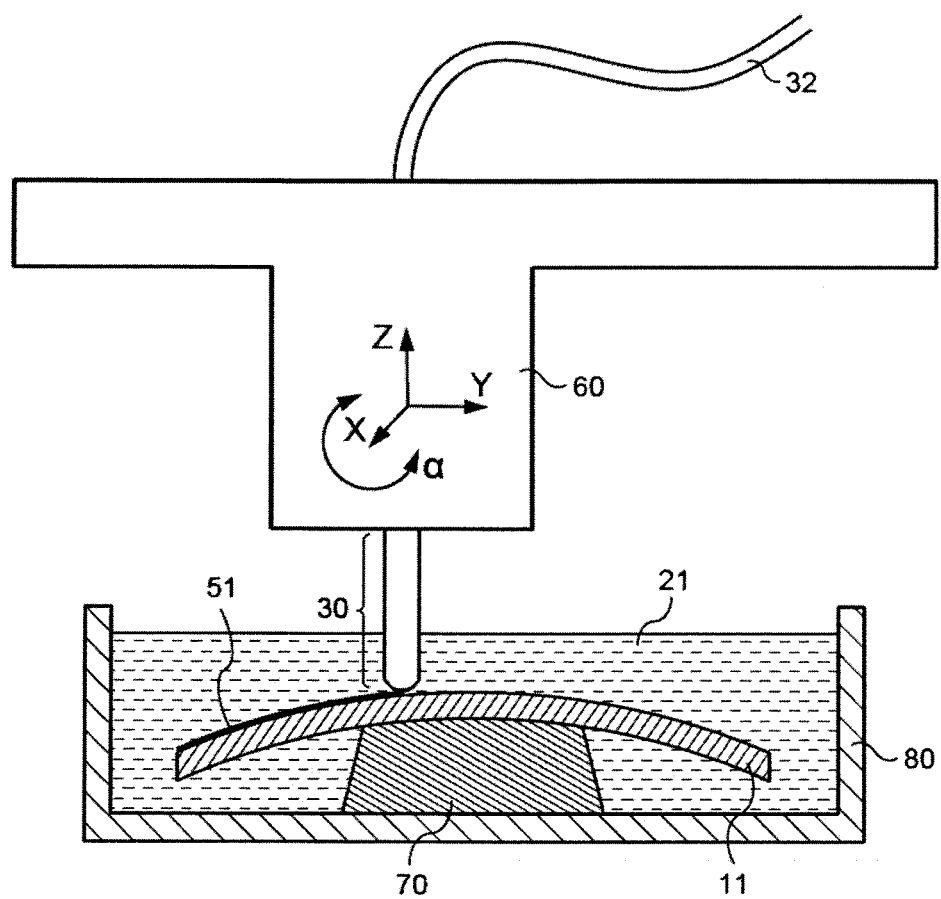
FIG. 2 illustrates another exemplary method of the invention for producing a customized eyewear lens.

FIGS. 2, 3 and 4 show additional views of another exemplary and preferred embodiment of the invention. In FIG. 2, the lens substrate 11 is shown positioned on a lens substrate support 70 within the container 80 that holds flowable radiation-polymerizable material 21. The lens substrate is shown with the convex surface upward to illustrate another option for positioning. The lens substrate 11 may also be positioned with the concave surface upward, as in FIG. 1, or in various angled positions, depending on where one wishes to add material via the inventive method.

Lens substrate support 70 may be either fixed or moveable within the container. Various methods may be used to attach the lens substrate 11 to the support 70, including stationary resting, adhesive, vacuum, mechanical clamping, support points, static charge or other attachment techniques. In one preferred option, the support may contact or hold edges of the lens substrate that will not be affected by the additive process; in another embodiment, support 70 may contact protective materials, coatings or layers that have been applied to the lens substrate (rather than or in addition to contacting the lens substrate itself). In other options, the support 70 (or at least the surface of the support in contact with the lens substrate) may comprise material that secures the lens substrate, such as, for example, deformable wax, solder, alloy, or plasticine. In other preferred embodiments, support 70 may comprise clamps, grips, tension points, fixtures, cradles, small attachments, adhesive areas and other mechanisms known in the art to hold, support or guide the lens substrate 11 into known position(s). In a further preferred embodiment, support 70 may comprise features to control the position of the lens substrate, such as active or passive position sensors and transducers; pivoting or ratcheting arms with détentes or fixable stops; x, y, z translational and/or tilt stages; and other mechanisms known to those of ordinary skill in the art.

Irradiation assembly 30 in FIG. 2 comprises controlled irradiation directed through a radiation delivery system 32 and emitted from an outer casing to provide the irradiating beam for the flowable radiation-polymerizable material. The irradiating beam will be described in greater detail with reference to FIGS. 3 and 4. Added material 51, formed by selective irradiation of the flowable radiation-polymerizable material in contact with the lens substrate 11, is shown to the left of the irradiation assembly in FIG. 2.

Preferably, irradiation assembly 30 is mounted in an irradiation support device 60 that allows controlled movement of the irradiation element with respect to the lens substrate 11. In FIG. 2, the irradiation support device allows the irradiation assembly 30 (and its associated irradiating beam) to move at least from left to right across the lens substrate as viewed. In a preferred embodiment, irradiation support device 60 allows at least Y-axis and Z-axis movement (axes as defined previously for FIG. 1); in another preferred embodiment, irradiation support device 60 allows translational and rotational movement of irradiation assembly 30, such that its distance to the lens substrate surface and/or its angle with respect to the lens substrate's surface may be controlled or changed during irradiation of the bulk flowable material 21 with the irradiating beam that is directed or emitted from 30. These controlled movements may be effected, for example, by use of a translation stage for irradiation support device 60. In another preferred embodiment the stage or irradiation support device may be powered by a voice coil, electrically actuated, or controlled with a PLC for reproducible positioning of the irradiation assembly and its directed irradiating beam.

For other embodiments of the inventive method, irradiation support device 60 may allow controlled movement of the irradiation assembly and/or the irradiating beam relative to the surface of the flowable radiation-polymerizable material. In other preferred embodiments, irradiation support device 60 may be configured to maintain a fixed position of the irradiating beam emitted by the irradiation assembly relative to the surface of the flowable radiation-polymerizable material, the container 80, or the lens substrate.

FIG. 3 shows greater detail of irradiation assembly 30 for the embodiment of the invention described in FIG. 2. In this example, irradiation assembly 30 comprises a remote radiation source (not shown) with a radiation delivery system 32, such as a guide tube or fiber optic cable. In this example, the irradiation assembly further comprises a protective casing 38, which may provide, for example, mechanical strength, ease of handling, or chemical, optical, electrical or physical shielding for the irradiating energy, its power supply or parts of this assembly. In the example of FIG. 3, the irradiation assembly 30 further comprises control optics 34 to shape and/or modify the energy distribution of the irradiating beam 31. In this instance, control optics 34 is a focusing lens; one of skill in the art will recognize that control optics 34 may also be constructed of one or more optical parts, and its operation may comprise wavelength filters, reflectors, absorbers, polarizers, collimating optics, expanding optics, beam directing optics, mirrors, beamsplitters and the like.

An additional preferred optional element for irradiation assembly 30 is shown in FIG. 3 as cover plate 36, which protects the optics and radiation delivery system of element 30 from contact with the flowable radiation-polymerizable material. Cover plate 36 may be particularly helpful if one wishes to sharply focus light from irradiation assembly 30 at the surface of, or preferably, within the bulk of the flowable radiation-polymerizable material. The cover plate 36 is preferably made of material with high transmission at the wavelength or wavelengths chosen for the selective polymerization; for instance, if UV light in the range of 280-320 nm is employed, a fused silica or quartz cover plate may be preferred over a glass cover plate, due to higher UV light transmittance. In another preferred embodiment, the cover plate further comprises coatings, treatments or intrinsic material properties that reduce or inhibit adhesion of the flowable radiation-polymerizable material to its outer surface; this can be important to maintain the desired irradiation properties, particularly if the cover plate may be in contact with material 21. Such coatings, treatments or materials will be selected based on the nature and chemistry of the flowable radiation-polymerizable material to be used, and could comprise hydrophobic, oleophobic, oleophilic, hydrophilic, fluorinated, silanated, textured or other properties as needed. For best performance, it may be necessary to periodically clean, condition, or re-treat the cover plate 36 to maintain good transmission of the light from the irradiation assembly, and the desired radiation characteristics of the irradiating beam. In another embodiment, the cover plate 36 may have a removable coating or protector that can be renewed or replaced to maintain good transmission. Such protectors or removable coatings may also be applied to the protective casing 38 of element 30 to prevent or reduce unwanted build-up of material, if necessary. In another preferred embodiment, the control optics 34 may include focusing or compensating optical parts to correct for spherical aberrations introduced by the presence of the cover plate in the irradiating beam.

In FIG. 3, the highly focused irradiating beam 31 provided by the irradiation assembly 30 is shown with the same hatch patterning as used in FIG. 1. The flowable radiation-polymerizable material 21 is shown around and in contact with irradiation assembly 30 and in contact with the convex surface of lens substrate 11. Irradiating beam 31 is illustrated converting the flowable material 21 to polymerized added material in the cross-hatched zone 51*a* directly under the focused beam, and to the left of the irradiating beam is shown added material 51 that has been previously and selectively polymerized by irradiation onto the lens substrate. To effect further selective polymerization in this or other areas on the lens substrate, the lens substrate, the irradiation element, or both, may be moved relative to each other. Such movement may comprise translational and/or rotational movement in one or more axes.

FIG. 4 is another expanded view of the embodiment of the invention illustrated in FIG. 2. FIG. 4 illustrates an exemplary irradiating beam 31 at a different point in time during the inventive additive process. At this point in the added material design, it is desired to form a thicker layer of polymerized added material on lens substrate 11. FIG. 4 illustrates one method to accomplish this. In this instance, the focusing and energy density properties of irradiating beam 31 have been dynamically changed from those of FIG. 3 to create a larger selected area (51*a*) for conversion of flowable radiation-polymerizable material. Various techniques can be employed to effect this active adjustment of the irradiating beam, such as changes to the control optics 34, the position of the irradiating beam relative to the lens substrate, the position of the irradiation assembly relative to the lens substrate, or active control of the radiation source and/or elements in the irradiation assembly. FIG. 4 shows a larger selected area (an expanded focal region) with sufficient energy to form the added material according to the added material design. As shown, active or passive control of the focal region of the irradiating beam (its Rayleigh range) can be used to expand or contract the selected area that will be irradiated with sufficient energy and the proper spatial distribution to polymerize the flowable radiation-polymerizable material according to the added material design.

FIGS. 3 and 4 provide additional description and illustration of the invention's selective irradiation step, in which the area of irradiation is controlled for spatial position relative to the lens substrate.

Figure 5:
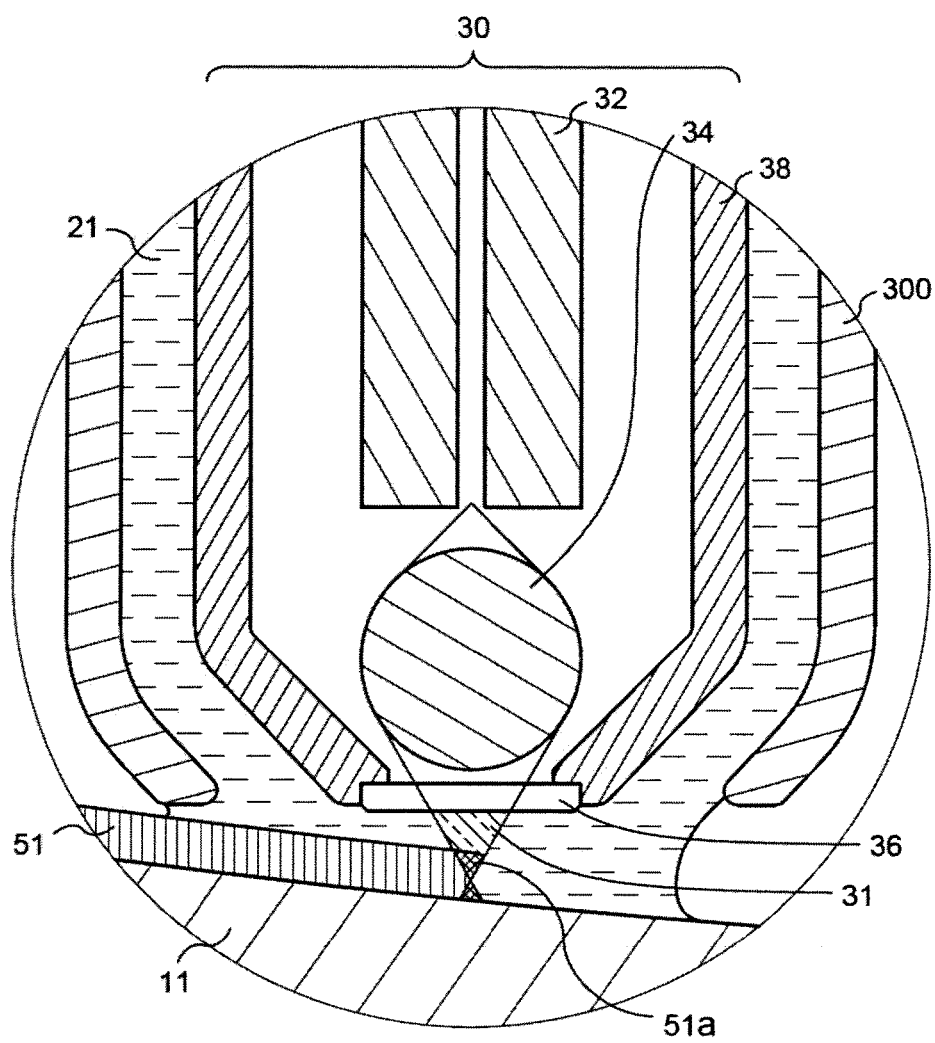
FIG. 5 illustrates an alternative method of the invention.

FIG. 5 illustrates another preferred embodiment of the invention. In this example, a material delivery jacket 300 provides a channel and delivery region for the flowable radiation-polymerizable material 21. The outer, material delivery jacket 300 surrounds an irradiation assembly 30 that is similar to that shown in FIG. 3. The irradiation assembly 30 comprises a remote radiation source (not shown) directed through a radiation delivery system 32 to form an irradiating beam 31 via sharply focusing control optics 34. The irradiation assembly is enclosed by a protective casing 38 and a cover plate 36. The material delivery jacket 300 may be an added feature combined with irradiation assembly 30, a separate structure from the irradiation assembly, or a structure capable of being separated from the irradiation assembly. Alternatively, jacket 300 may be positioned at a fixed distance and orientation relative to element 30.

In these and other embodiments of the invention, the purpose of material delivery jacket 300 is to present material 21 at controlled positions at and around the irradiating beam for the additive processing. Advantageously, this describes another embodiment to provide a bulk source of flowable radiation-polymerizable material for contact with the surface(s) and for irradiation, but allows a much more limited amount of the material to be used. In addition, in this embodiment the flowable radiation-polymerizable material is provided more precisely to the specific region needed for the added material design. It may also limit excess wetting of the lens substrate, and therefore eliminate extra steps for drying or cleaning the lens after processing. This alternative approach may be particularly useful if the flowable radiation-polymerizable material is very expensive, highly reactive, or sensitive to degradation due to exposure to moisture, atmosphere, extraneous light or other factors.

While the figures detail selective polymerization on one surface of the lens substrate, it is clear that these or other techniques can be used to form added material on both surfaces of the lens substrate for the customized eyewear lens. For example, multiple irradiating beams can be used and directed toward each surface. As another example, a single irradiating beam can be used, but divided and directed by optics to irradiate both surfaces of the lens substrate. In another example, a single irradiating beam can be directed such that it illuminates one surface of the lens substrate, but also penetrates through the substrate with sufficient controlled energy to selectively polymerize flowable material on both surfaces. With transparent lens substrates, this may be a preferred embodiment of the invention for speed and convenience of manufacture.

In a preferred embodiment, the optional sensor measurements are compared to expected values or results for the added material design and adjustments made depending on these results. Such adjustments can include modifications to the added material design, to the selective irradiation, or to how the flowable radiation-polymerizable material contacts the lens substrate surface(s).

An advantage of this invention's method is that one is not as dependent upon the global dimensional accuracy, but upon the localized curvature and thickness of the added material. This allows more accommodation of variance and larger error limits during the added material design processing. Advantageously, the optional sensing techniques allow one using the inventive method to monitor the process, and prevent accumulation of errors as the lens is built.

For example, if the error showed that polymerized added material was deposited too thickly at a certain location, additional flowable radiation-polymerizable material may be added (and polymerized) adjacent to that location to lessen the effect. In another example, if polymerized added material is present on an area that was not originally intended for such added material (for example, if a few droplets splashed onto another area of the lens substrate), it may be possible to correct this error by contacting that portion of the lens substrate with a flowable radiation-polymerizable material having a different refractive index or ameliorative optical properties to hide this error. In another embodiment, the position and/or angle of the lens substrate can be adjusted such that subsequently added material will be added in revised positions or amounts to correct for the errors detected by the measured values. In a further embodiment, the area of irradiation in the bulk of the flowable radiation-polymerizable material may be altered in terms of its position, distance or angle relative to the lens substrate's surface(s) to provide the added material in the needed positions to effect the conversion of the lens substrate's optical power properties (and optionally, other selected lens properties) to the customized eyewear lens optical power properties. Other controlled irradiation conditions, such as energy and spatial distribution may be recalculated and adjusted to correct for detected differences. Alternatively, depending on the flowable radiation-polymerizable material used, it may be possible to remove some of the previously added material to correct or lessen the error. Other corrections encompassed by the invention would be recognized from these examples by those of ordinary skill in the art.

In another preferred embodiment of the invention, two or more different flowable radiation-polymerizable materials are used to form the added material to convert the lens substrate to the customized eyewear lens. The flowable radiation-polymerizable materials may be mixed (if compatible) in set or varying ratios during the additive process to create intermediate or graded properties, or the lens substrate can be brought into contact with different flowable radiation-polymerizable materials individually and sequentially during the added material design to effect the desired optical power change and optionally, other property changes. The selective radiation may be similarly designed or chosen to change during these flowable radiation-polymerizable material changes, for optimized polymerization of the different materials.

In another embodiment, the same flowable radiation-polymerizable material may be used throughout the added material design, but different components may be included at different stages or for different positions of added material on the lens substrate. For example, if the added material is designed to provide photochromic response as well as the optical power change, one may choose (given the high cost of photochromic dyes) to concentrate the dyes only in the last few micrometers of the thickness of the added material. This could be accomplished, for example, by using a flowable radiation-polymerizable material that is compatible with desired photochromic dyes, but only adding those dyes to the last portion of the flowable radiation-polymerizable material that will be formed according to the added material design. As another example, pigments, reflective, or conductive particles may be added for deposition at defined and discrete positions on the lens to provide markings or electrical circuitry. The method described in FIG. 5 may be particularly well suited for modifications of the flowable radiation-polymerizable material such as these, since the delivery of the material is more closely controlled and can be more easily sequenced in its content than with a large, liquid holding tank.

In another preferred embodiment, a layer comprising photo-initiator may be included with the added material design. In one embodiment, the lens substrate comprises a photo-initiator layer, which may be coated, for example, on one or both of the lens substrate's surfaces; in another embodiment, a thin photo-initiator layer may be coated over the flowable radiation-polymerizable material. The photo-initiator layer may comprise material compatible with the radiation-polymerizable material(s) to be used in the process, and capable of integrally bonding to them. In another preferred embodiment, the photo-initiator layer may further comprise thermal initiator(s) that may aid in accelerating or tailoring the polymerization reaction. In one embodiment, the layer comprising photo-initiator may be very thin, such that it does not affect the overall optical power of the added material design. These optional layers of photo-initiator are one preferred addition by the inventors to control and enhance the depth and extent of cure of the adjacent radiation-polymerizable materials.

In another embodiment of the invention, a primer layer may be applied to the lens substrate before it contacts the flowable radiation-polymerizable material. Such primer layers may enhance adhesion, or ameliorate stress or thermal expansion mismatch, between the lens substrate and the added material.

Once the added material design is complete, unreacted flowable radiation-polymerizable material can be removed from the customized eyewear lens by moving the lens substrate out of contact with the flowable material or by moving the flowable material away from the lens substrate. The unreacted material may also be removed from the surface by chemical methods, such as solvent rinse, solution soaking, vapor cleaning, plasma treatment, or other techniques known in the art. As another option, the unreacted material may be removed by physical methods, such as etching, washing, mild abrasive, doctor blade contact, wicking, or other techniques known in the art.

Optionally, other coatings may be added to the customized lens after the added material design is complete. Examples of some other coatings include: hard coat or abrasion-resistant coatings, smoothing coatings, photochromics, electrochromics, thermochromics, coatings to improve cleanability, polarized coatings, anti-reflective coatings, filter coatings, and conductive coatings or active coatings for display applications. These may be applied by various known techniques, including liquid or gas phase deposition. Exemplary additional coatings that are particularly suited for gas phase deposition techniques (such as vapor, atmospheric, corona, plasma and physical or chemical vacuum deposition) include anti-reflective coatings, filter coatings and conductive coatings. These and other coatings may be applied alone or in combination to provide optional additional lens features.

In addition, the optional coatings may include other features added to the lens in, with, on or into the coatings. Examples of some of these features include decorative imprints; decals; jewelry; embedded chips, displays, transmitters or sensors; micro-optics; and semi-visible marks for lens identification.

Another optional step after completing the added material design is to post-cure the lens. Post-curing may be used for various purposes, including, for example, to anneal, stabilize, relieve material stress, densify or enhance the final properties of the added material and the resultant customized lens. In a preferred embodiment, a post-cure exposure to heat and light can reduce yellowness of some polymerized added materials. A post-cure step may involve general exposure of the lens to broad spectrum thermal, infrared or other forms of energy, or controlled exposure to a specific wavelength range. This is sometimes used as a finishing step in eyewear lens production.

When the added material design has been fully formed and irradiated, and any optional steps have been performed, the customized lens production according to the invention is complete.

When the customized lens is completed, it may be placed in the individually chosen eyewear frame. It may be necessary to edge the customized lens to its final size to accomplish this step. Alternatively, in one preferred embodiment of the invention, the lens substrate is edged to fit the frame prior to performing the added material process; this simplifies assembly of the final eyewear. In another preferred embodiment, the lens substrate and the eyewear frame are fitted together prior to the inventive process, and the entire set of eyewear proceeds through the added material process. In this embodiment, if desired, added material can be formed on the eyewear frame as well as the lens substrate for new or enhanced features. In another preferred embodiment, the added material process can create the eyewear frame to be used with the customized lens.

These variations and configurations are not comprehensive of all possible embodiments, but provide examples that one skilled in the art would recognize are within the scope of the invention.

The invention will now be described in more specific detail with reference to the following non-limiting examples.

EXAMPLE 1

Figure 6:
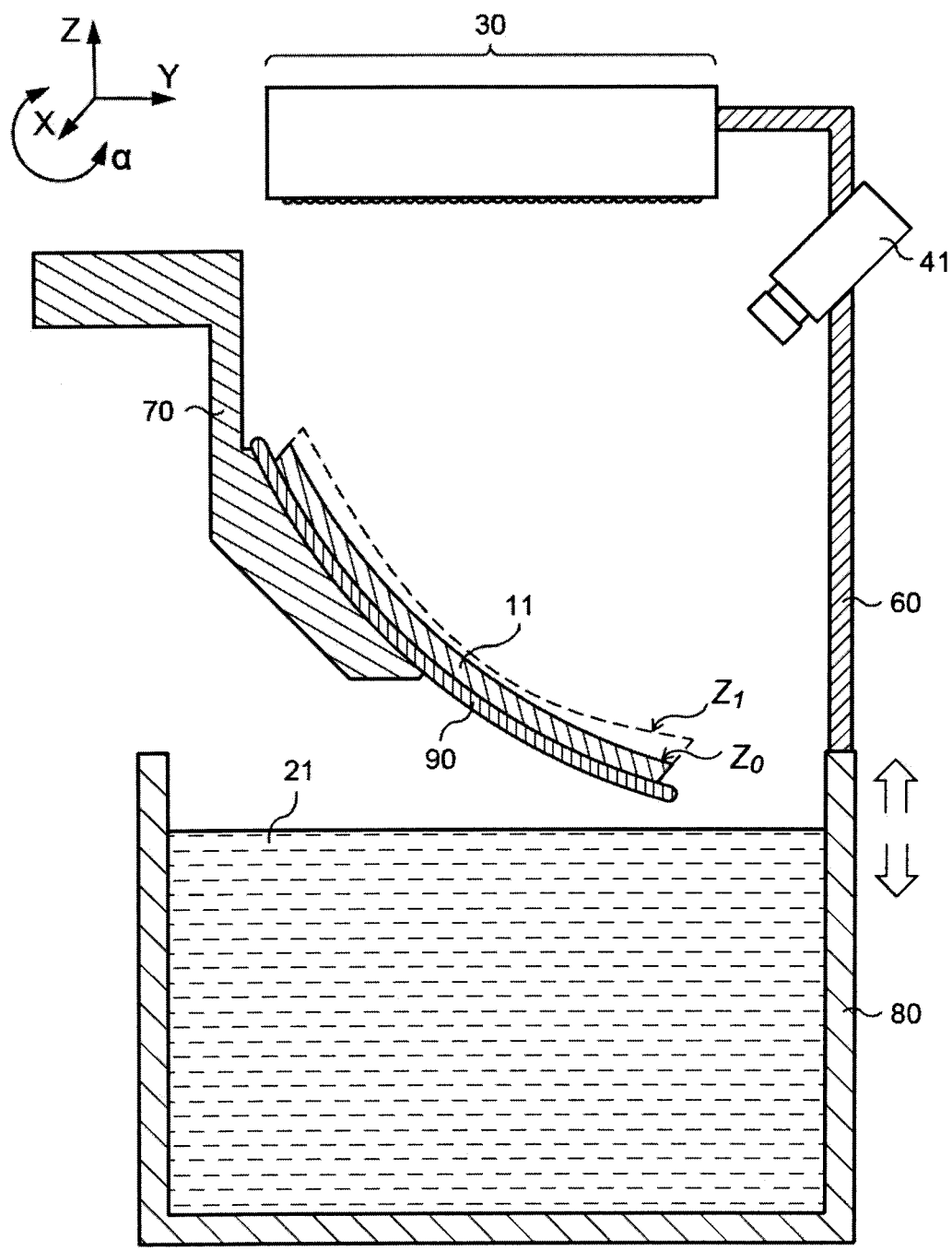
FIG. 6 illustrates another alternative method of the invention.

As illustrated in FIG. 6, a lens substrate 11 is mounted on lens substrate support 70 that allows controlled, fixed positioning of the lens substrate. In this Example, lens substrate support 70 comprises multiple points that contact, support and fixedly position the lens substrate. The convex surface of the lens substrate is further protected by a protective element 90, and support 70 contacts the protective element 90 while supporting the substrate.

The lens substrate 11 is a finished plano comprising finished and polished concave and convex surfaces. The lens substrate is made from a lens material with a refractive index of 1.5, with radii of curvature on both its convex and concave surfaces of 125 mm, and a minimum thickness of 1.0 mm. The lens substrate has a rectangular shape that is 50 mm wide (along the horizontal axis of the lens as it will be mounted in the frame and worn) and 30 mm in height. The concave surface will be exposed to the flowable radiation-polymerizable material 21.

An added material design is generated to convert the plano lens substrate 11 into a minus powered lens with a through optical power of −2 D. Using a flowable radiation-polymerizable material that provides polymerized material with a refractive index of 1.5, the added material design will build upon the lens substrate such that a new surface $Z_1$ (indicated by dotted lines in FIG. 6) is created on the concave surface (designated $Z_0$ on the lens substrate 11). The volume that needs to be built with added material is the volume enclosed between $Z_1$ and $Z_0$. The resultant surface $Z_1$ created by the added material design has a radius of curvature of 83.3 mm, is 1 mm thick at its minimum thickness near the center of the lens, and 2.3 mm thick at the temporal side of the rectangular lens.

The X, Y, Z coordinate system is defined as in FIG. 1, and shown again in FIG. 6. The substrate is tilted by the lens substrate support 70 such that it is held at an inclination of 45° around the X-axis on the X, Y, Z coordinate system. The holding mechanism maintains the lens substrate 11 in a fixed, stationary position throughout the added material design process.

An aluminum tank functions as container 80 and holds the flowable radiation-polymerizable material 21 with a maximum depth of 50 mm for this Example. The tank can move up and down along the Z axis, in a stepped or continuous fashion, providing encoder signals that allow for the determination of the position along the Z axis with 0.001 mm accuracy. For Example 1, the tank is raised vertically at a uniform speed of 0.1 mm/s during the building process.

The level of the flowable radiation-polymerizable material in the tank, and its position relative to the lens substrate 11 held in the fixed support 70, is measured continuously. This is achieved by a CCD camera 41 that measures the position of the center of the image of a red LED source reflected from the top surface of the flowable radiation-polymerizable material 21. The camera has a wide field of view, such that it can view the surface $Z_0$ of lens substrate 11, the surface of material being added by the process to lens substrate 11, and the surface of the flowable material 21 simultaneously. In Example 1, this camera signal is further cross-referenced to the tank encoder signals to confirm the positions of the tank and the flowable material.

Irradiation support device 60 comprises fixed beams that securely mounts the irradiation assembly 30 and also attaches to container 80. Thus, in this Example, irradiation support 60 not only maintains the position of irradiation assembly 30, but also provides an additional feature of maintaining a fixed, known distance between the container for the flowable material and the irradiation assembly. In this manner, as the tank is raised vertically, the irradiation assembly moves with the tank relative to the fixed position of the lens substrate. In this example, the camera 41 is also mounted on irradiation support device 60, to maintain a fixed relationship between the view of the camera and the position of the irradiation assembly.

Irradiation assembly 30 is a UV/visible DLP projector mounted above container 80. The projector emits light in the 405 nm range, with a total energy of 20 W, and an array of 1024×768 pixels. The projector is equipped with controlling optics such that the projected size of a pixel on the surface of the material 21 is approximately a 50 micron wide circle. This means that if all pixels are illuminated, the total array provides an illuminated area roughly 38 mm along the X axis and 51 mm along the Y axis. The projector's optics also include a light diffusor to provide a certain degree of blending and overlap between pixels and avoid uncured spaces between pixels.

The projection of light from each pixel of the array is calibrated as a function of vertical distance Z, from the irradiation assembly. For any given $Z_i$, the positions $x_i$ and $y_i$ of each pixel are well established with a precision of 0.001 mm.

As container 80 is raised, a computer system is used to perform the calculation of the intersection between the volume that needs to be built and the horizontal plane defined by $Z=Z_i$, that corresponds to the measured level of flowable radiation-polymerizable material relative to the fixed position of the lens substrate at that instant. This calculation embodies the added material design and yields the area on the surface or depth of material 21 that needs to be irradiated at each instant in time. The calculation then provides controlling signals to each pixel such that individual pixels are turned off or on to form one or more irradiating beams to illuminate the desired $x_i y_i$ area for added material formation. The control of the pixels is done in a continuous manner that allows for an update of the state of each pixel in a few milliseconds.

To perform the material deposition according to the added material design, the tank moves upwards in a continuous manner, and the lens substrate is then immersed in the flowable radiation-polymerizable material in a continuous controlled manner. As shown in FIG. 6, the lens substrate 11 will first contact the flowable material 21 on its right-hand edge, and then as the tank is moved upward, the angled substrate will continue to be immersed toward the left side of the substrate. At the same time, the volume that needs to be built on the lens on top of the substrate is being cured by providing the correct irradiation pattern via irradiating beams formed by individually controlled pixels of the UV/visible DLP at each instant in time. First, pixels will be illuminated at the right edge of the array to begin and continue polymerization of material 21 as it contacts the right edge of the substrate. As the tank is moved upward, the material 21 will contact more of the upper surface of substrate 11 and additional or different pixels will be activated to continue polymerization of the material according to the added material design. The movement of the tank and the programmed on/off signaling of the pixels in irradiation assembly 30 continues until the added material design accomplishes the addition of all the material needed to create the new thickness identified by dotted line $Z_1$. The signals from camera 41 are used to confirm that material is being added as needed to achieve the $Z_1$ added material design.

After all the added material has been deposited, non-polymerized material is washed off the substrate.

EXAMPLE 2

In another embodiment, a −2 D 65 mm round hard resin (n=1.50) lens substrate 11 is mounted in a configuration as illustrated in FIG. 1. In this Example, material is intended to be polymerized onto the concave (uppermost as viewed in FIG. 1) surface of the lens substrate to create a +2.00 D add power in an 25 mm round area on the lower portion of the inner surface of the resultant lens as it will be worn in an eyeglass frame. This 25 mm area corresponds to a region near the edge of the lower right-hand portion of the uppermost lens surface in FIG. 1.

A 365 nm mercury atomic emission lamp with collimating optics is used for irradiating beam 31 to provide a 5 mm circular diameter irradiating beam. A CCD camera 41 is used to view the surface of the lens substrate, the flowable radiation-polymerizable material and the added material on the lens substrate created by the process. The flowable radiation-polymerizable material will provide added polymerized material with a refractive index of 1.60.

The volume and position (relative to the lens substrate surface) of added 1.60 refractive index material needed to create a +2.00 Diopter add area on the customized eyewear lens is calculated and stored as the added material design.

Before flowable radiation-polymerizable material is introduced into the area near the lens substrate, the position of the irradiating beam 31 relative to the lens substrate 11 is calibrated by moving the substrate with its support's X, Y, Z and rotational controls to the substrate's extreme positions and recording these coordinates. Once calibration is complete, the lens substrate is moved to its starting position and tilt (rotational orientation) just to the left of the irradiating beam. Flowable radiation-polymerizable material 21 is placed in a container of sufficient size and depth to accommodate the 65 mm lens substrate. The lens substrate is then moved via the position and orientational controls of its support 70 to contact the surface of the bulk of material 21 at an angle of approximately 45 degrees. The lens substrate is then angled down into the flowable radiation-polymerizable material while the irradiating beam 31 is controlled to selectively polymerize the flowable material, according to the added material design, only on the uppermost surface of the lens substrate. The camera sensing element 41 provides video of the added polymerized material and the movement of the lens substrate so that the process can be monitored and the speed or position of the lens substrate adjusted if needed to create the customized lens with the correct optical properties.

Once the added material is fully irradiated and formed according to the added material design, the customized eyewear lens is moved entirely out of the flowable radiation-polymerized material and washed to remove any residual flowable material.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein. Accordingly, the invention is identified by the following claims.

What is claimed is:

1. A method of producing a customized eyewear lens comprising:
    a) obtaining a lens substrate comprising a first surface that will be nearest the eye when worn and a second surface that will be farthest from the eye when worn;
    b) calculating and generating an added material design to convert the lens substrate's optical power to a desired optical power for the customized eyewear lens, wherein the desired optical power of the customized eyewear lens is discernibly different to the unaided eye from the lens substrate's optical power;
    c) contacting at least a portion of at least one of the first and second surfaces of the lens substrate with a bulk source of a flowable radiation-polymerizable material; and
    d) while the lens substrate is in contact with the bulk source of flowable radiation-polymerizable material, irradiating the flowable radiation-polymerizable material with radiation from an irradiation assembly comprising at least one irradiating beam that is controlled for wavelength range, energy and spatial distribution to polymerize the flowable radiation-polymerizable material only in a selected area of irradiation, wherein the flowable radiation-polymerizable material is irradiated according to the added material design to form added material on the lens substrate and create the desired optical power of the customized eyewear lens, wherein the area of irradiation is controlled for spatial position relative to the lens substrate, and wherein the added material is integrally bonded to the lens substrate; and
    wherein external shaping structures are not used during the steps of contacting and irradiating the flowable radiation-polymerizable material.

2. The method of claim 1, further comprising covering one of the first and second surfaces of the lens substrate with a protective material.

3. The method of claim 1, wherein the step of irradiating polymerizes the flowable radiation-polymerizable material on only one of the first and second surfaces of the lens substrate.

4. The method of claim 1, wherein calculating and generating the added material design further comprises calculating and generating optical property modifications of the lens substrate selected from the group consisting of prism, magnification, oblique aberration, power distribution at different locations on the lens, individual field of view, individual angle of view for near vision, decentration, back vertex distance, frame shape, eyewear frame wrap angle, and eyewear frame tilt.

5. The method of claim 1, wherein the lens substrate is selected from the group consisting of finished lens blanks, semi-finished lens blanks, plano lens blanks, plano edged lenses and finished edged lenses.

6. The method of claim 1, wherein the area of irradiation is controlled for spatial position relative to the lens substrate by moving one of the lens substrate, the irradiation assembly, and the irradiating beam.

7. The method of claim 1, wherein the added material has measurably different properties from the lens substrate, and the added material's measurably different properties are selected from the group consisting of refractive index, Abbe value, abrasion resistance, impact resistance, resistance to organic solvents, resistance to bases, Tg, visible color, visible transmittance, UV transmittance, electrical conductivity, polarization and photochromic properties.

8. The method of claim 1, further comprises controlling the lens substrate's orientation relative to the flowable radiation-polymerizable material.

9. The method of claim 8, wherein controlling the lens substrate's orientation comprises:
a) mounting the lens substrate in a support comprising one or more position and movement controls selected from the group consisting of translational movement along the X axis, Y axis, and Z axis, and rotational movement around the X axis, and
b) moving the lens substrate with at least one of the position and movement controls during at least one of the steps of contacting and irradiating.

10. The method of claim 9, wherein moving the lens substrate during the step of irradiating further comprises forming the added material such that it smooths over features selected from at least one edge of the added material, at least one defect of the added material, at least one defect on at least one surface of the lens substrate, and discontinuities on a portion of at least one surface of the lens substrate.

11. The method of claim 1, wherein the wavelength range of the irradiating beam is selected from microwave, radiofrequency, ultraviolet, visible and infrared radiation.

12. The method of claim 1, wherein the flowable radiation-polymerizable material comprises components selected from the group consisting of UV reflectors, UV absorbers, infrared reflectors, infrared absorbers, visible tints, dyes, pigments, photochromic agents, electrochromic agents, thermochromic agents, polarizing materials, thermal stabilizers, electrically conductive materials, liquid crystal materials, light absorbing particles, light reflecting particles, sensors, transmitters, and displays.

13. The method of claim 1, wherein the step of irradiating comprises forming added material only in selected positions, thicknesses and slopes on the lens substrate.

14. The method of claim 1, wherein the step of contacting further comprises immersing at least a portion of at least one of the first and second surfaces of the lens substrate in the bulk source and moving the lens substrate in a continuous, controlled manner.

15. A method of producing a customized eyewear lens comprising:
a) obtaining a lens substrate comprising a first surface that will be nearest the eye when worn and a second surface that will be farthest from the eye when worn;
b) calculating and generating an added material design to convert the lens substrate's optical power to a desired optical power for the customized eyewear lens, wherein the desired optical power of the customized eyewear lens is discernibly different to the unaided eye from the lens substrate's optical power;
c) mounting the lens substrate in a lens substrate support comprising one or more position and movement controls;
d) contacting at least a portion of one of the first and second surfaces of the lens substrate with a bulk source of a flowable radiation-polymerizable material and controlling the lens substrate's orientation relative to the bulk source of flowable radiation-polymerizable material during contacting by use of the position and movement controls of the lens substrate support; and
e) while the lens substrate is in contact with the bulk source of flowable radiation-polymerizable material, irradiating the flowable radiation-polymerizable material with an irradiating beam output from an irradiation assembly, wherein the radiation of the irradiating beam is controlled for wavelength range, energy and spatial distribution to polymerize the flowable radiation-polymerizable material only in a selected area of irradiation, wherein the selected area of irradiation is controlled for spatial position relative to the lens substrate, wherein the flowable radiation-polymerizable material is irradiated according to the added material design to form added material on the lens substrate by polymerization, wherein the added material is integrally bonded to the lens substrate, and wherein the bulk source of flowable radiation-polymerizable material is delivered via an outer delivery jacket surrounding the irradiation assembly;

wherein the added material in combination with the lens substrate creates the desired optical power of the customized eyewear lens; and wherein external shaping structures are not used during contacting and irradiating the flowable radiation-polymerizable material.

16. The method of claim 15, wherein the irradiation assembly further comprises a protective casing and a cover plate.

17. The method of claim 15, wherein the step of irradiating further comprises moving the irradiating beam relative to the lens substrate.

18. The method of claim 15, wherein the outer delivery jacket is separable from the irradiation assembly.

* * * * *